US012558903B2

(12) United States Patent
Fujiwara

(10) Patent No.: US 12,558,903 B2
(45) Date of Patent: Feb. 24, 2026

(54) PRINTING APPARATUS, PRINTING SYSTEM AND METHOD OF CONTROLLING PRINTING APPARATUS

(71) Applicant: CANON KABUSHIKI KAISHA, Tokyo (JP)

(72) Inventor: Izumi Fujiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/493,127

(22) Filed: Oct. 24, 2023

(65) Prior Publication Data

US 2024/0140103 A1 May 2, 2024

(30) Foreign Application Priority Data

Oct. 26, 2022 (JP) ................................ 2022-171584

(51) Int. Cl.
*B41J 2/175* (2006.01)

(52) U.S. Cl.
CPC ....... *B41J 2/17566* (2013.01); *B41J 2/17509* (2013.01); *B41J 2/17513* (2013.01)

(58) Field of Classification Search
CPC .... B41J 2/175; B41J 2/17503; B41J 2/17506; B41J 2/17509; B41J 2/17513; B41J 2/17546; B41J 2/17566; B41J 2002/17569; B41J 29/38; B41J 29/393; B41L 27/04; H04N 1/00244
See application file for complete search history.

(56) References Cited

U.S. PATENT DOCUMENTS

2019/0152223 A1* 5/2019 Hirasawa ............ B41J 2/16511
2021/0197603 A1* 7/2021 Tanaka ................ G06Q 10/087
2023/0182477 A1* 6/2023 Okuno ................ B41J 2/17553

FOREIGN PATENT DOCUMENTS

JP 2015-077812 A 4/2015
JP 2017-094590 A 6/2017

* cited by examiner

*Primary Examiner* — Anh T Vo
(74) *Attorney, Agent, or Firm* — Venable LLP

(57) ABSTRACT

In a printing apparatus, an ink tank holds ink to be supplied to a print head. Ink can be replenished in the ink tank by a plurality of types of ink bottles of different ink capacities for the same color of ink. A management unit manages information for an ink consumption amount, which is an amount of ink consumed in the ink tank. An updating unit updates the information for the ink consumption amount based on an ink capacity corresponding to an ink bottle used to replenish ink among the plurality of types of ink bottles.

17 Claims, 20 Drawing Sheets

FIG. 7A

3000

| Ref. | Item | Value | Ref. |
|---|---|---|---|
| 3001 | INK OUTAGE ERROR CRITERIA CONSUMPTION AMOUNT | 0: DISABLED, 1: ENABLED | |
| 3002 | INK:BK(BLACK) | | |
| | INK OUTAGE ERROR CRITERIA CONSUMPTION AMOUNT | 0 TO 100% CONSUMPTION AMOUNT | 3006 |
| | 50% INK CONSUMPTION AMOUNT | 50% CONSUMPTION AMOUNT | 3010 |
| | INK OUTAGE ERROR CRITERIA CONSUMPTION AMOUNT | 100% CONSUMPTION AMOUNT | 3014 |
| | INK CONSUMPTION AMOUNT RESET COUNT | 0 TO COUNT | 3018 |
| 3003 | INK: C (CYAN) | | |
| | INK OUTAGE ERROR CRITERIA CONSUMPTION AMOUNT | 0 TO 100% CONSUMPTION AMOUNT | 3007 |
| | 50% INK CONSUMPTION AMOUNT | 50% CONSUMPTION AMOUNT | 3011 |
| | INK OUTAGE ERROR CRITERIA CONSUMPTION AMOUNT | 100% CONSUMPTION AMOUNT | 3015 |
| | INK CONSUMPTION AMOUNT RESET COUNT | 0 TO COUNT | 3019 |

FIG. 7B

| | | | |
|---|---|---|---|
| 3004 | INK: M (MAGENTA) | | |
| | 3008 | INK OUTAGE ERROR CRITERIA CONSUMPTION AMOUNT | 0 TO 100% CONSUMPTION AMOUNT |
| | 3012 | 50% INK CONSUMPTION AMOUNT | 50% CONSUMPTION AMOUNT |
| | 3016 | INK OUTAGE ERROR CRITERIA CONSUMPTION AMOUNT | 100% CONSUMPTION AMOUNT |
| | 3020 | INK CONSUMPTION AMOUNT RESET COUNT | 0 TO COUNT |
| 3005 | INK: Y (YELLOW) | | |
| | 3009 | INK OUTAGE ERROR CRITERIA CONSUMPTION AMOUNT | 0 TO 100% CONSUMPTION AMOUNT |
| | 3013 | 50% INK CONSUMPTION AMOUNT | 50% CONSUMPTION AMOUNT |
| | 3017 | INK OUTAGE ERROR CRITERIA CONSUMPTION AMOUNT | 100% CONSUMPTION AMOUNT |
| | 3021 | INK CONSUMPTION AMOUNT RESET COUNT | 0 TO COUNT |
| 3022 | INK CONSUMPTION AMOUNT RESET CRITERIA | | 0: 100%, 1: 50% |
| 3023 | INK CONSUMPTION AMOUNT RESET COUNT CRITERIA | | 1 TIME |

PRINTING APPARATUS, PRINTING SYSTEM AND METHOD OF CONTROLLING PRINTING APPARATUS

BACKGROUND OF THE INVENTION

Field of the Invention

The present invention relates to a printing apparatus, a printing system, and a method of controlling a printing apparatus.

Description of the Related Art

A printing apparatus including a large-capacity ink tank measures an ink consumption amount of the large-capacity ink tank, and notifies a user that there is no ink when it is determined that there is no ink in the large-capacity ink tank. A method has been devised in which, when a user injects ink into a large-capacity ink tank, the printing apparatus resets the ink consumption amount to continue measuring the ink consumption amount. For example, a technique of notifying that ink will run out when the calculated remaining amount of ink becomes equal to or less than a threshold value has been disclosed (Japanese Patent Laid-Open No. 2015-77812). In addition, a technique for resetting the remaining amount of ink after ink is refilled (injected) into a large-capacity ink tank is disclosed. When the refilling (injecting) of the ink with respect to the large-capacity ink tank is completed, the user confirms the remaining amount of the ink in the ink tank and sets the remaining amount of the ink in the ink tank (Japanese Patent Laid-Open No. 2017-94590). This latter reference discloses a technique of more accurately setting an initial value of a remaining amount of ink at the time of resetting the remaining amount of ink by setting an ink amount injected into a large-capacity ink tank.

SUMMARY OF THE INVENTION

According to the present invention, it is possible to provide a printing apparatus on which it is easy to reset the ink consumption amount according to the ink capacity of each ink bottle even when ink is supplied to the ink tank using ink bottles having different ink capacities.

The present invention in one aspect provides a printing apparatus comprising an ink tank configured to hold ink to be supplied to a print head, wherein ink can be replenished in the ink tank by a plurality of types of ink bottles of different ink capacities for the same color of ink, a management unit configured to manage information for an ink consumption amount which is an amount of ink consumed in the ink tank, and an updating unit configured to update the information for the ink consumption amount based on an ink capacity corresponding to an ink bottle used to replenish ink among the plurality of types of ink bottles.

The present invention in another aspect provides a method of controlling a printing apparatus comprising managing information for an ink consumption amount which is an amount of ink consumed in an ink tank, wherein the ink tank is configured to hold ink to be supplied to a print head, and the ink can be replenished in the ink tank by a plurality of types of ink bottles of different ink capacities for the same color of ink, and updating the information for the ink consumption amount based on an ink capacity corresponding to an ink bottle used to replenish ink among the plurality of types of ink bottles.

The present invention in yet another aspect provides a printing apparatus comprising an ink tank configured to hold ink to be supplied to a print head, wherein ink can be replenished in the ink tank by a plurality of types of ink bottles of different ink capacities for the same color of ink, and a control unit configured to cause a display unit to display a selection screen for allowing a user to select an ink capacity corresponding to an ink bottle used to replenish ink among the plurality of types of ink bottles.

Further features of the present invention will become apparent from the following description of exemplary embodiments (with reference to the attached drawings).

BRIEF DESCRIPTION OF THE DRAWINGS

FIGS. 7A and 7B are views illustrating a data structure related to ink consumption amount information of the printer.

DESCRIPTION OF THE EMBODIMENTS

Figure 1:
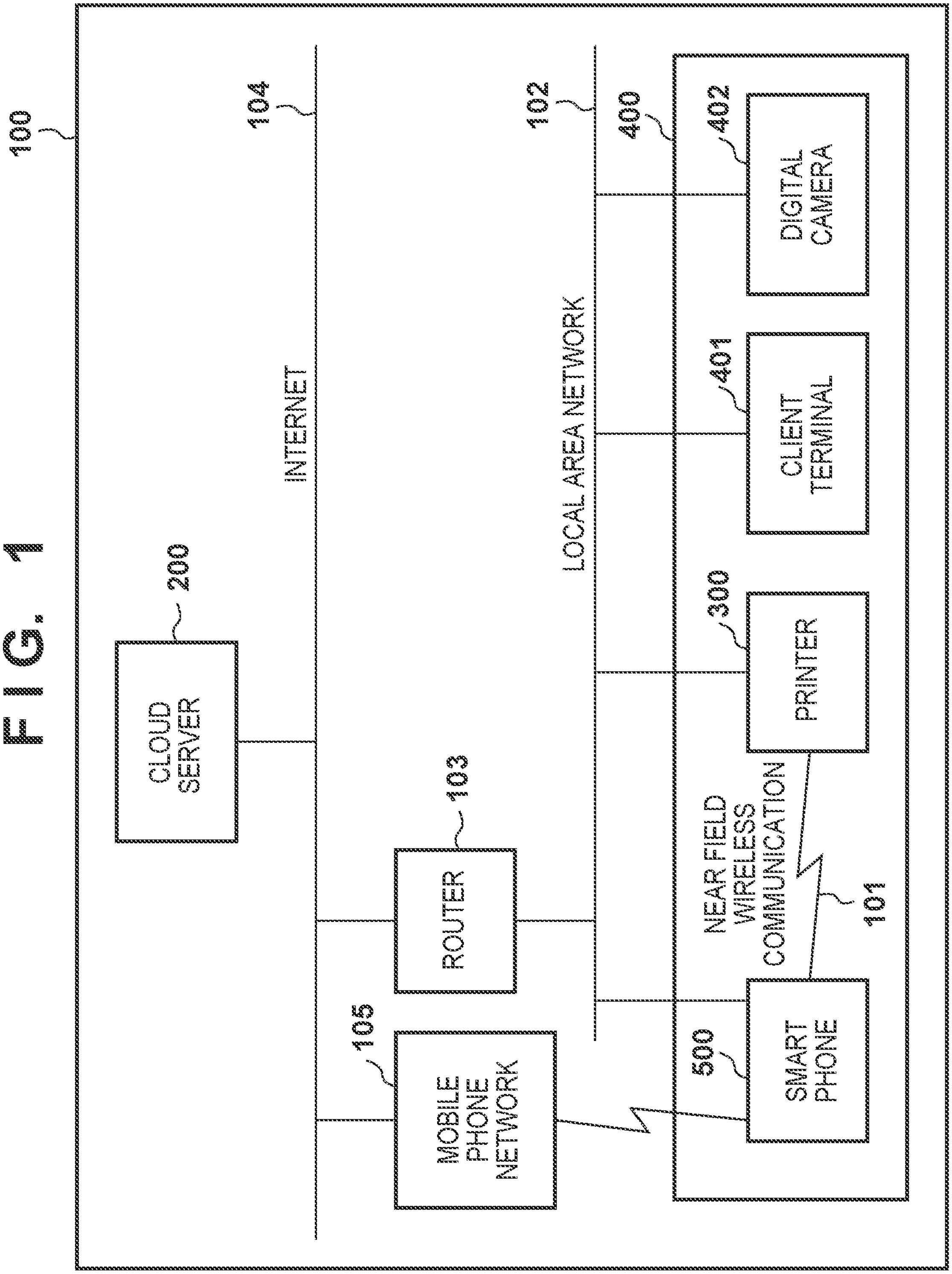
FIG. 1 is a view illustrating an example of a hardware configuration of a printing system of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view illustrating an example of a hardware configuration of a printing system of the present invention.

A printing system 100 includes a cloud server 200 and a device group 400 connected via a local area network 102 and the Internet 104.

The device group 400 includes, for example, a smart phone 500, a printer 300, a client terminal 401 such as a personal computer or a workstation, and a digital camera 402 as various apparatuses capable of network connection. However, the device group 400 is not limited to the above-described devices, and may include, for example, a household electric appliance such as a refrigerator, a television, or an air conditioner. The device group 400 is connected to each other via the local area network 102, and is connected to the Internet 104 via a router 103 installed in the local area network 102.

Although the router 103 is illustrated as a device that connects the local area network 102 and the Internet 104, it may have a wireless LAN access point function that constitutes the local area network 102. In this instance, configuration may be taken such that the device group 400 is not only connected to the router 103 via a wired LAN, but also is connected to an access point in a wireless LAN. For example, the printer 300 and the client terminal 401 are connected by the wired LAN, and the smart phone 500 and the digital camera 402 are connected by the wireless LAN. The device group 400 can communicate with the cloud server 200 via the router 103 and the Internet 104. Further, each device of the device group 400 can communicate with each other via the local area network 102.

The smart phone 500 and the printer 300 can communicate with each other by near field wireless communication 101. The near field wireless communication 101 includes, for example, wireless communication compliant with a Bluetooth (registered trademark) standard or an NFC standard. The smart phone 500 is also connected to a mobile phone network 105 and can communicate with the cloud server 200 via the mobile phone network 105. For example, although an example in which the router 103 has an access point function has been described, an apparatus different from the router 103 may have an access point function.

In the present embodiment, an example of a multi-function printer (the MFP) having a scanner function and other functions is exemplified as the printer 300.

Figure 2A:
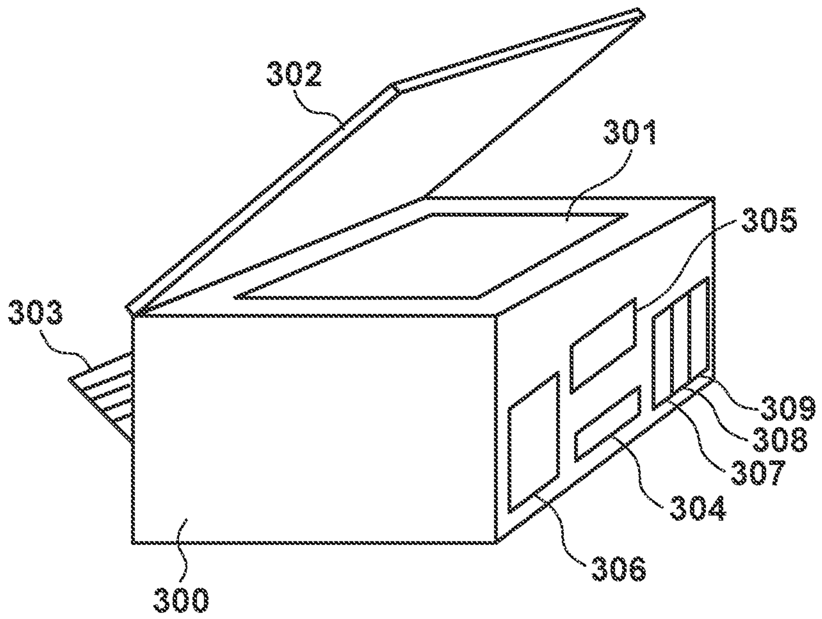
FIG. 2A is an external view of a printer.

FIG. 2A illustrates an overall external view of the printer 300.

An original platen 301 is a glass-like transparent table and is used when a document is read by a scanner. An original is placed on the original platen 301.

An original platen pressure plate 302 presses the original onto the original platen 301 so that the original does not float when the original is read by the scanner. The original platen pressure plate 302 is a cover for preventing external light from entering the scanner unit.

A print sheet insertion port 303 is an insertion slot for setting print sheets of various sizes. The print sheets set in the print sheet insertion port 303 are conveyed to a printing unit one by one, and discharged to a print sheet discharge port 304 after the image forming process. A near field communication unit and a wireless LAN antenna are disposed in an upper portion (not illustrated) of the original platen pressure plate 302. The near field communication unit (not illustrated) is a unit for performing near field wireless communication, and can communicate with a communication partner (near field communication unit) present within a predetermined distance. The wireless LAN antenna is an antenna for connecting to the local area network 102 using a wireless LAN.

Figure 2B:
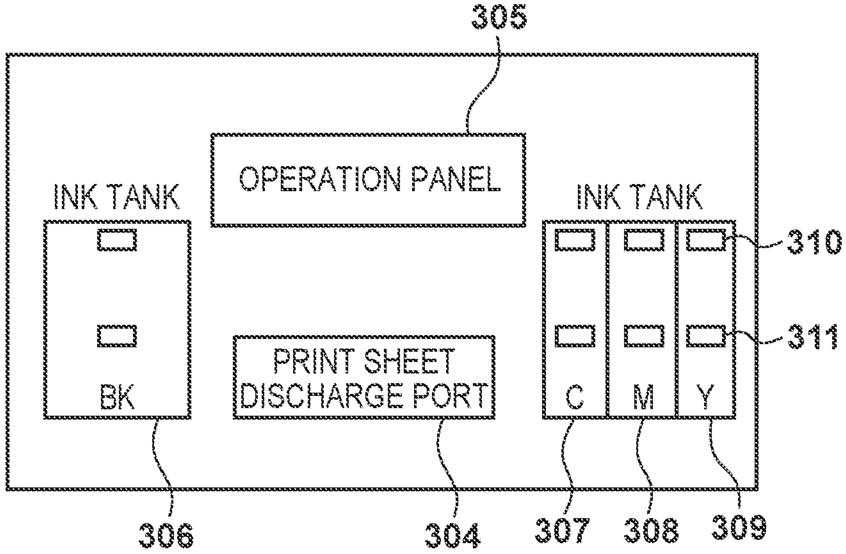
FIG. 2B is an external view of a printer.

FIG. 2B illustrates a front external view of the printer 300.

An operation panel 305 and the aforementioned print sheet discharge port 304 are provided on a front surface portion of the printer 300. An ink tank of each ink color that supplies ink to a print head that ejects the ink is mounted inside the printer 300. The ink tanks of the respective ink colors include an ink tank 306, an ink tank 307, an ink tank 308, and an ink tank 309. The ink tank 306 includes Black ink. The ink tank 307 includes Cyan ink. The ink tank 308 includes Magenta ink. The ink tank 309 includes Yellow ink. Hereinafter, the respective ink colors (Black, Cyan, Magenta, Yellow) are abbreviated as "BK", "C", "M", and "Y".

The ink tanks 306 to 309 have ink injection ports (not illustrated). The user can open a cap covering the ink injection port and inject the ink in the ink bottle (described later) into the ink tank being filled. The user can confirm the remaining amount of the ink injected into the ink tanks 306 to 309 in front of the printer 300. An indicator 310 and an indicator 311 are provided on the front surface of the ink tanks 306 to 309. For example, the indicator 310 indicates that the remaining amount of ink in the ink tank is 100%. Meanwhile, the indicator 311 indicates that the remaining amount of ink in the ink tank is 50%.

When the liquid surface of the ink in the ink tank is at the position of the indicator 310, it indicates that the remaining amount of ink in the ink tank is at full capacity (100%). When the liquid surface of the ink in the ink tank is at the position of the indicator 311, it indicates that the remaining amount of ink in the ink tank is half the capacity (50%). The number of indicators indicating the remaining amount of ink in the ink tank is not limited to two, and may be three or more. For example, an indicator indicating that the remaining amount of ink in the ink tank is 75% may be provided in the ink tank, and an indicator indicating that the remaining amount of ink in the ink tank is small may be provided in the ink tank.

Figure 2C:
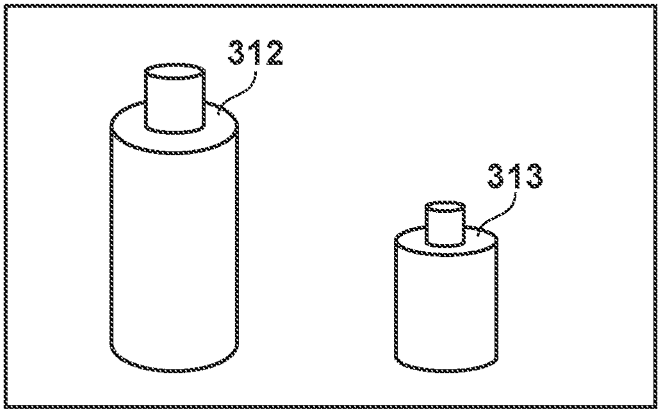
FIG. 2C is an external view of an ink bottle.

FIG. 2C illustrates an external view of ink bottles.

As ink bottles for injecting ink from the injection ports of the ink tanks 306 to 309, there are a large-capacity bottle 312 and a small-capacity bottle 313.

The large-capacity bottle 312 holds ink that can fill to capacity (100%) the remaining amount of ink in any of the ink tanks 306 to 309. The large-capacity bottle 312 can hold inks corresponding to the respective ink colors ("BK", "C", "M", and "Y"). For example, when the remaining amount of ink in the ink tank 306 is 0%, the ink in the large-capacity bottle 312 is injected into the ink tank 306. In this case, the liquid surface of the ink in the ink tank 306 appears in the indicator 310.

The small-capacity bottle 313 holds ink that can fill to half capacity (50%) the remaining amount of ink in any of the ink tanks 306 to 309. The small-capacity bottle 313 can hold inks corresponding to the respective ink colors ("BK", "C", "M", and "Y"). For example, when the remaining amount of ink in the ink tank 306 is 0%, the ink in the small-capacity bottle 313 is injected into the ink tank 306. In this case, the liquid surface of the ink in the ink tank 306 appears in the indicator 311.

When the capacities of the ink tanks 306 to 309 are different for each ink color, the amounts of ink held by the large-capacity bottle 312 and the small-capacity bottle 313 of each ink color are different. For example, as illustrated in FIG. 2B, the ink tank 306 can hold a larger capacity of ink than the ink tanks 307 to 309. That is, the large-capacity bottle 312 for the ink tank 306 is larger than the large-capacity bottle 312 for the ink tanks 307 to 309. Also, the small-capacity bottle 313 for the ink tank 306 is larger than the small-capacity bottle 313 for the ink tanks 307 to 309.

Figure 3:
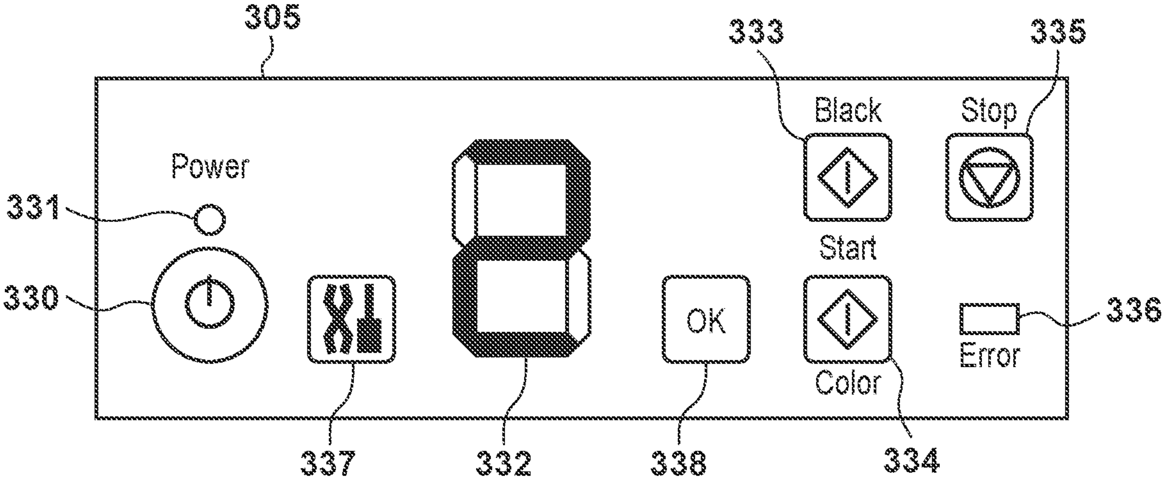
FIG. 3 is a view illustrating a configuration of an operation panel of the printer.

FIG. 3 is a view illustrating a configuration of an operation panel of the printer.

The operation panel 305 includes an indicator lamp using a light-emitting diode (LED) and input keys for receiving user operations. The operation panel 305 of the present embodiment does not have a liquid crystal screen capable of displaying graphics or a touch panel function.

A power key 330 is a key for performing an operation of turning on and off the power. When the user presses the power key 330 in the power-off state, the printer 300 shifts to the power-on state. When the user presses the power key 330 in the power-on state, the printer 300 shifts to the power-off state. When the user presses the power key 330 during an operation of the printer 300 such as printing, the printer 300 completes or stops the operation processing and then transitions to the power-off state.

A power lamp 331 is a lamp indicating a power state of the printer 300. The power lamp 331 is turned on in a power-on state and is turned off in a power-off state. The power lamp 331 may blink, for example, during an operation of the printer 300, during a power-on process, or during a power-off process.

A number display unit 332 displays the number of presses of a key for specifying a number of copies when the printer 300 copies an original or for specifying the type of maintenance job. The number display unit 332 includes a seven-segment LED, and can display a number from 0 to 9 or the like by controlling which of the respective parts are on and off. In FIG. 3, the number display unit 332 displays "2".

A monochrome start key 333 and a color start key 334 are keys for starting a printing operation (for example, copying) that runs on the printer 300 alone. When the user presses the monochrome start key 333 in the power-on standby state, the printer 300 executes a monochrome copy operation. Also, when the user presses the color start key 334 in the power-on standby state, the printer 300 executes a color copy operation. The monochrome start key 333 and the color start key 334 are used to execute other operations and processes in accordance with the state of the printer 300 and an operation combining other keys.

A stop key 335 is a key for interrupting an operation or a process during execution of the printer 300 and returning to the standby state. When the user presses the stop key 335 in an error state of the printer 300, an error of the printer 300 can be cancelled, and the job being executed can be cancelled.

An error lamp 336 is a lamp indicating an error state of the printer 300. The error lamp 336 is turned off when the printer 300 is in a normal state, and is turned on or flashes when an error occurs in the printer 300. The error may be, for example, an error indicating that there is no ink remaining in the ink tank, an error indicating that there are no print sheets, or an error indicating that a print sheet is jammed in the printer 300. The error lamp 336 may notify the user of the type of error occurring in the printer 300 by changing the blinking pattern of the error lamp 336. In addition, the printer 300 can also indicate the type of the error and a countermeasure therefor to the user by controlling the lighting and blinking of the error lamp 336 and the display of the number display unit 332.

When the user presses a maintenance key 337, a state of waiting for execution of a job for performing maintenance of the printer 300 is entered. When the user presses the monochrome start key 333 or the color start key 334 in the state of waiting for maintenance job execution, the printer 300 executes the maintenance job. In this case, the printer 300 does not execute the copy operation. The maintenance job executed by the printer 300 may be changed according to the number of times the user presses the maintenance key 337 in the state of waiting for the maintenance job execution. For example, when the user has pressed the maintenance key 337 once, the printer 300 performs cleaning of a head that ejects ink. When the user has pressed the maintenance key 337 twice, the printer 300 performs a reset of the ink consumption amount. The printer 300 controls whether each part of the number display unit 332 is turned on or off to thereby display the number of times the user has pressed the maintenance key 337. As a result, the user can recognize the number of times the maintenance key 337 has been pressed.

When the user presses an OK key 338, the number of copies of the printer 300 is changed. When the printer 300 detects that the OK key 338 is pressed, the respective parts of the seven-segment LED included in the number display unit 332 are controlled to be turned on and off to display the number of print copies.

Figure 4:
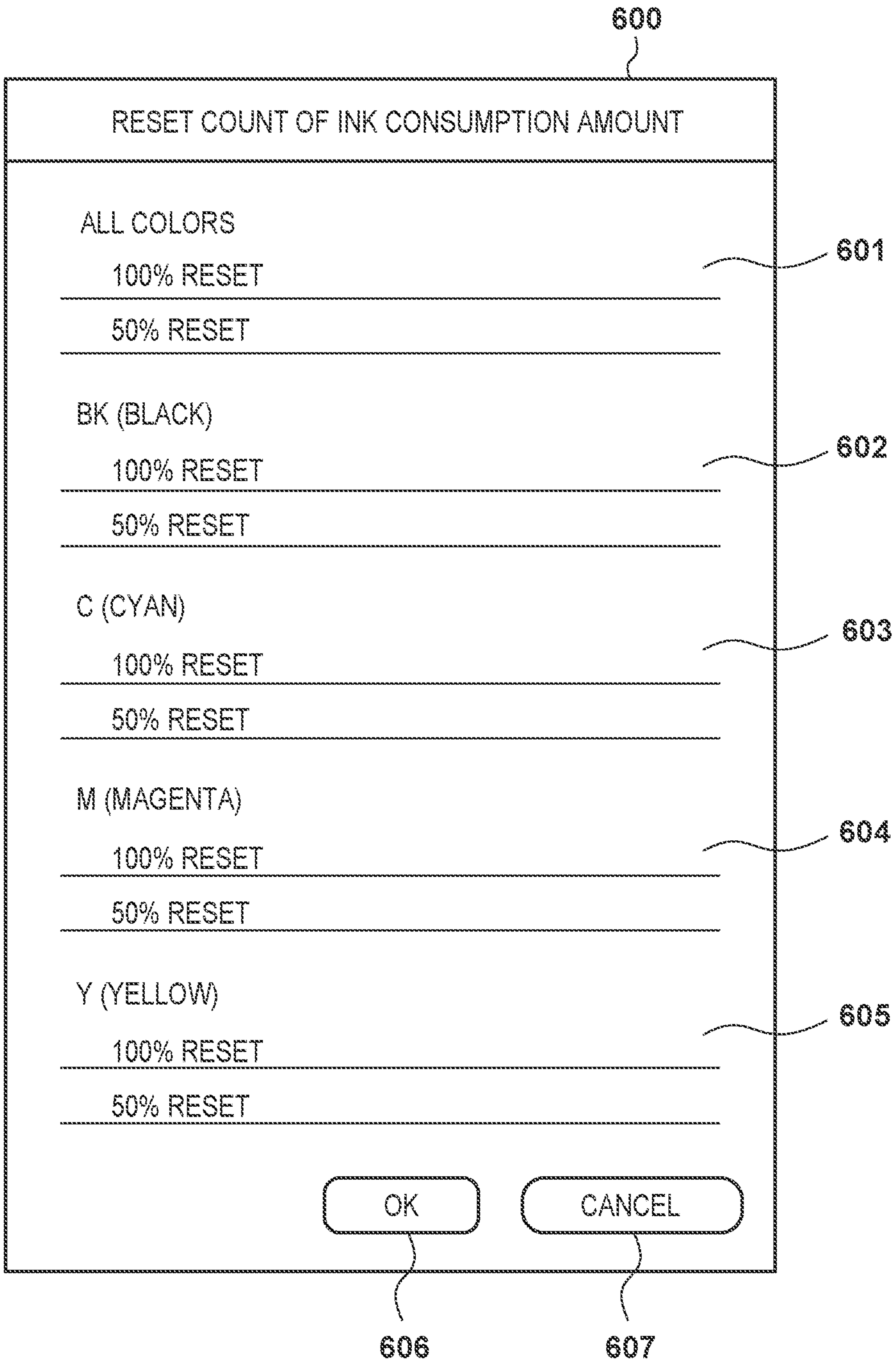
FIG. 4 is a view illustrating a configuration of a screen for resetting a count for an ink consumption amount of a remote UI.

FIG. 4 is a view illustrating a configuration of a screen for resetting a count for an ink consumption amount of a remote UI.

The remote User Interface (UI) is a screen corresponding to the operation panel 305 of the printer 300. The smart phone 500 and the client terminal 401 can display a remote UI provided by the printer 300 on respective display units of the smart phone 500 and the client terminal 401. The printer 300 distributes, as a Web server, remote UI content built into the printer 300 to the smart phone 500 and the client terminal 401. The smart phone 500 and the client terminal 401 can display remote UI content and can accept operations from a user by a Web browser function.

A screen 600 is a screen for resetting the count of the ink consumption amount. The screen 600 displays a list of options for resetting the ink consumption amounts of the ink tanks 306 to 309 of the printer 300. When the user resets the ink consumption amount for all the ink tanks, the user selects a button 601 (illustrated as "All Colors"). The button 601 has the items "100% reset" which is used when the user refills the ink tank with the large-capacity bottle 312 and "50% reset" which is used when the user refills the ink tank with the small-capacity bottle 313. Here, when the ink liquid surface of all the ink tanks is displayed on the indicator 310, the user selects execution of "100% reset" of the button 601. Accordingly, the printer 300 resets the ink consumption amount by subtracting 100% from the ink consumption amount (100%) of all the ink tanks (to get 0%). Next, when the ink liquid surface of all the ink tanks is displayed on the indicator 311, the user selects to execute the "50% reset" of the button 601. Accordingly, the printer 300 resets the ink consumption amount by subtracting 50% from the ink consumption amount (50%) of all the ink tanks (to get 0%).

The user selects a button 602 when resetting the ink consumption amount only for the ink tank 306 (BK ink). The user selects a button 603 when resetting the ink consumption amount only for the ink tank 307 (C ink). The user selects a button 604 when resetting the ink consumption amount only for the ink tank 308 (M ink). The user selects a button 605 when resetting the ink consumption amount only for the ink tank 309 (Y ink). Note that the buttons 602 to 604 have items of "100% reset" and "50% reset" as in the case of the button 601.

At the lowermost portion of the screen 600, an OK button 606 and a cancel button 607 are provided. When the user presses the OK button, the printer 300 is notified of the details of the selected ink consumption amount reset, and the screen 600 is closed. When the user presses the cancel button 607, the contents of the selected ink consumption amount reset are discarded, and the screen 600 is closed.

Although an example has been described in which the user selects a button for resetting the ink consumption amount for any one of the ink tanks and the printer 300 executes the reset function, the present invention is not limited to this. For example, the user may select a button for resetting the ink consumption amounts of a plurality of ink tanks. That is, an interface capable of checking an ink tank for resetting the ink consumption amount may be realized by preparing a check box next to each of the ink buttons 602 to 605 on the screen 600 of FIG. 4. Then, when the user checks the check boxes of the respective inks and presses the OK button 606, an instruction to reset the ink consumption amounts of the plurality of checked ink tanks is notified to the printer 300. The printer 300 can also support resetting the ink consumption amount of the plurality of ink tanks by executing the process of resetting the ink consumption amount of the selected ink tank.

Figure 5:
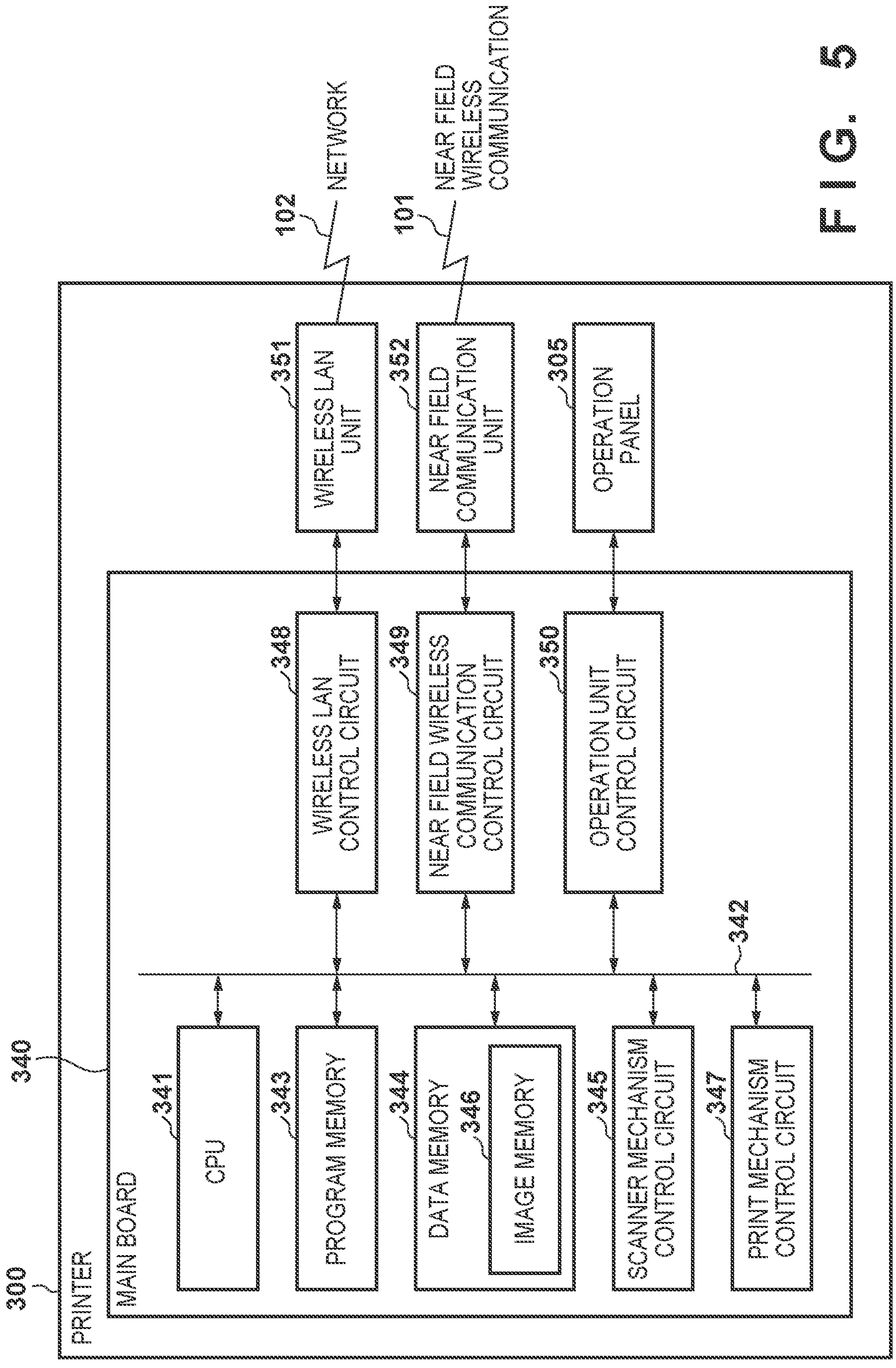
FIG. 5 is a block diagram illustrating a hardware configuration of the printer.

FIG. 5 is a block diagram illustrating a hardware configuration of the printer.

The printer 300 includes a main board 340 that controls the entire apparatus, a wireless LAN unit 351, and a near field communication unit 352.

A CPU 341 is a microprocessor and operates in accordance with a control program stored in a program memory 343 and the content of a data memory 344 via the internal bus 342. The program memory 343 is a ROM. The data memory 344 is a RAM.

The CPU 341 reads an original by controlling a scanner mechanism control circuit 345, and stores the read image in an image memory 346 in the data memory 344. The CPU 341 may also control a print mechanism control circuit 347 to print the image of the image memory 346 in the data memory 344 onto a recording medium. The CPU 341 performs wireless LAN communication with another communication terminal apparatus (not illustrated) by controlling the wireless LAN unit 351 via a wireless LAN communication control unit 348. In addition, the CPU 341 can control the near field communication unit 352 via a near field wireless communication control circuit 349 to detect a connection with another near field communication terminal (not illustrated). The CPU 341 is capable of transmitting and receiving data to and from other near field communication terminals. The CPU 341 controls an operation unit control circuit 350 to display the state of the printer 300 and the function selection menu on the operation panel 305, and accepts an operation from the user.

Figure 6:
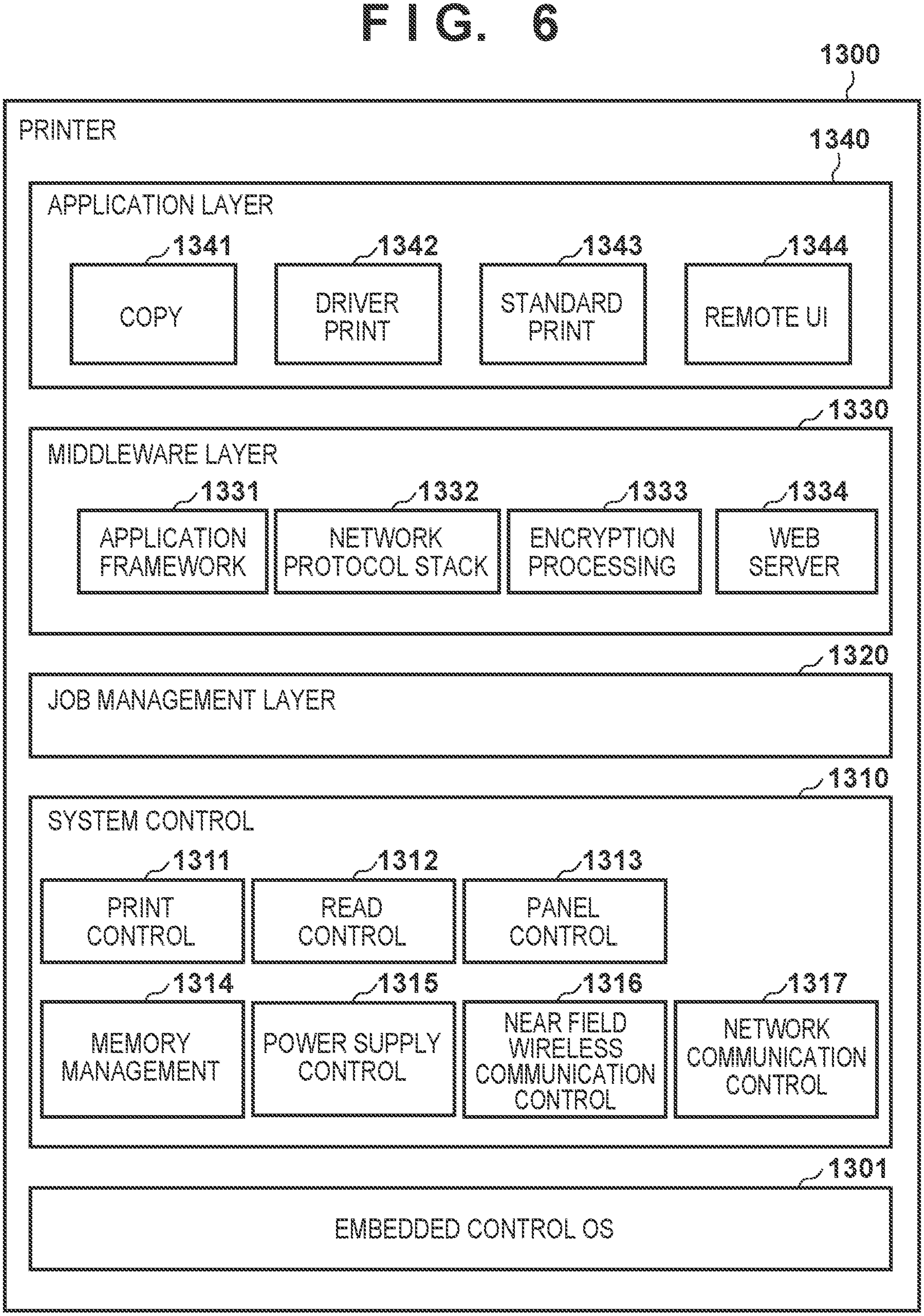
FIG. 6 is a view illustrating a configuration of software modules that run on the printer.

FIG. 6 is a view illustrating a configuration of software modules that run on the printer.

Software 1300 running on the printer 300 runs on an embedded control OS 1301. Each module is classified into a system control layer 1310, a job management layer 1320, a middleware layer 1330, and an application layer 1340.

The embedded control OS 1301 is an operating system (OS) that controls the basic operation of the software 1300, and is generally a real-time OS with excellent responsiveness.

The system control layer 1310 is a module group mainly responsible for hardware control of the printer 300.

A print control module 1311 is a control module for controlling the print mechanism control circuit 347 to execute a print operation of the printer 300.

A read control module 1312 is a control module for controlling the scanner mechanism control circuit 345 to execute an operation to read an original placed on the original platen 301.

A panel control module 1313 is a control module for controlling the display of the operation panel 305 of the printer 300 and detecting various key operations.

A memory management module 1314 is a control module for performing management such as dynamic allocation of the data memory 344 and the image memory 346.

A power supply control module 1315 is a control module for controlling the power supply of the printer 300, supplying power necessary for the operation of the printer 300 to each block of hardware, and performing control of a power saving mode.

A near field communication control module 1316 is a control module for controlling the near field communication unit 352 and communicating with a terminal apparatus such as the smart phone 500.

A network communication control module 1317 is a control module for controlling the wireless LAN unit 351 and performing control of the physical layer for communication in order to communicate over the LAN with an external apparatus.

The job management layer 1320 performs resource allocation, concurrency control, scheduling, and the like of hardware based on a job execution request from a higher layer. The job management layer 1320 is a module group that executes various operations using the system control layer 1310.

The middleware layer 1330 is located between the application layer 1340 and the job management layer 1320, and is a group of modules commonly used by a plurality of functional modules in the application layer 1340.

An application framework 1331 is a framework module commonly used when making a request for job execution from the application layer 1340 to the job management layer 1320.

A network protocol stack 1332 is a module for performing communication compliant with various network protocols such as HTTP and TCP/IP.

An encryption processing module 1333 is a module for performing encryption and decryption processing necessary for network communication or the like.

A Web server module 1334 is a module for operating the printer 300 as a Web server to deliver remote UI content.

The application layer 1340 is a group of applications that realize various functions of the printer 300.

A copy application 1341 is an application module for executing a copy operation of reading and printing an original.

A driver print application 1342 is an application module for receiving jobs from printer drivers of the smart phone 500 and the client terminal 401 and executing operations based on the received jobs. The jobs from the printer drivers include a print job for executing printing, a scan job for outputting image data obtained by reading an original, and a maintenance job for exchanging information with an external apparatus to set and manage the printer 300.

A standard print application 1343 is an application module that receives a job from a standard print service of the system of the smart phone 500 and executes an operation based on the job. A job from the standard print service is a print job for executing printing and a scan job for outputting image data obtained by reading an original. However, since the standard print service is provided by the smart phone manufacturer and a standard OS vendor, there is a restriction that it is impossible to perform specific settings and management of printer models of individual manufacturers by using the standard print service.

A remote UI module 1344 is a module that provides a remote UI function of the printer 300 to an external apparatus using the Web server module 1334. The remote UI can configure and manage the printer 300. In particular, in the printer 300, since information that can be displayed and set on the operation panel 305 is limited, a remote UI is used for more detailed setting and management of the printer 300. In addition, when dedicated drivers are not prepared for the smart phone 500 and the client terminal 401, only the standard print service is available, and therefore, use of a remote UI is indispensable for detailed setting and management of the printer 300.

FIGS. 7A and 7B are views illustrating a data structure related to ink consumption amount information of the printer.

Ink consumption amount information 3000 includes an ink consumption amount detection function 3001, data sets 3002 to 3005 corresponding, respectively, to the four colors of ink, ink consumption amount reset criteria 3022, and ink consumption amount reset count criteria 3023.

The data sets 3002 to 3005 provide fields for ink consumption amount, 50% ink consumption amount, ink outage error criteria consumption amount, and ink consumption amount reset count.

The ink consumption amount detection function 3001 is a function of estimating the ink consumption amount in each ink tank of the printer 300, and manages flag information for determining whether to execute ink consumption amount detection. The ink consumption amount detection function 3001 uses a "dot count method". When the ink consumption amount detection function 3001 indicates "0" as the flag information, the CPU 341 does not execute the ink consumption amount detection function. Meanwhile, when the ink consumption amount detection function 3001 indicates "1" as the flag information, the CPU 341 executes the ink consumption amount detection function. It is assumed that the ink consumption amount detection function 3001 has "1" as an initial value of the flag information. Here, the ink consumption amount detection function 3001 will be described supplementarily. The printer 300 has an ink consumption amount counter inside the printer 300. The CPU 341 calculates the ink consumption amount when the printer 300 performs a print operation, a recover operation, or the like, and adds the ink consumption amount to the ink consumption amount counter, thereby realizing the ink consumption amount detection function 3001.

In ink consumption amounts 3006 to 3009 corresponding to the respective ink colors, the ink consumption amounts of the ink tank 306 to the ink tank 309 of the printer 300 are stored. The ink consumption amount of each ink tank is updated by adding the ink consumption amount to the counter after execution of a copy, a driver job, a maintenance job, or the like that consumes ink.

In 50% ink consumption amounts 3010 to 3013 corresponding to respective ink colors, the ink consumption amount corresponding to 50% of each ink color is stored. An ink consumption amount of 50% means the ink consumption amount when ink has been consumed from the indicator 310 until the indicator 311 of each ink tank.

Ink outage error criteria consumption amounts 3014 to 3017 corresponding to respective ink colors indicate a criteria value for notifying an ink outage error. As the printer 300 continues to consume ink, the value of the ink consumption amount approaches the ink outage error criteria consumption amount value. When the ink outage error criteria consumption amount and the ink consumption amount coincide with each other, or when the ink consumption amount exceeds the ink outage error criteria consumption amount, the CPU 341 determines that there is no ink in the respective ink tank and notifies the ink outage error. The present embodiment stores a 100% ink consumption amount in the ink outage error criteria consumption amounts 3014 to 3017. An ink consumption amount of 100% means the ink consumption amount when ink has been consumed by the printer 300 from the indicator 310 of each ink tank until the ink of each ink tank runs out.

In ink consumption amount reset counts 3018 to 3021 corresponding to respective ink colors, the ink consumption amount reset count of each ink color is stored. When the ink consumption amount is reset, the ink consumption amount reset count of the ink color to be reset is updated. The initial value is the value 0.

The units of the ink consumption amount stored in the data sets 3002 to 3005 corresponding to the four colors of ink are not limited to percentage (%), and may be weight (mg) or volume (ml).

In the present embodiment, the ink outage error criteria consumption amount of each ink color is set to a value of 100% consumption amount, but a value of 90% consumption amount may be stored as another value, for example. As a result, the printer 300 notifies the user of an ink outage error while ink remains in the ink tank. In this case, even after an ink outage error occurs, the printer 300 can execute a printer operation that consumes ink. In addition, a plurality of ink consumption amounts may be set in the ink outage error criteria consumption amount 3014 or the like. The values of the plurality of ink consumption amounts may not be the same. In other words, the printer 300 may issue a notification indicating that the ink is low before issuing an ink outage error notification.

Figure 16:
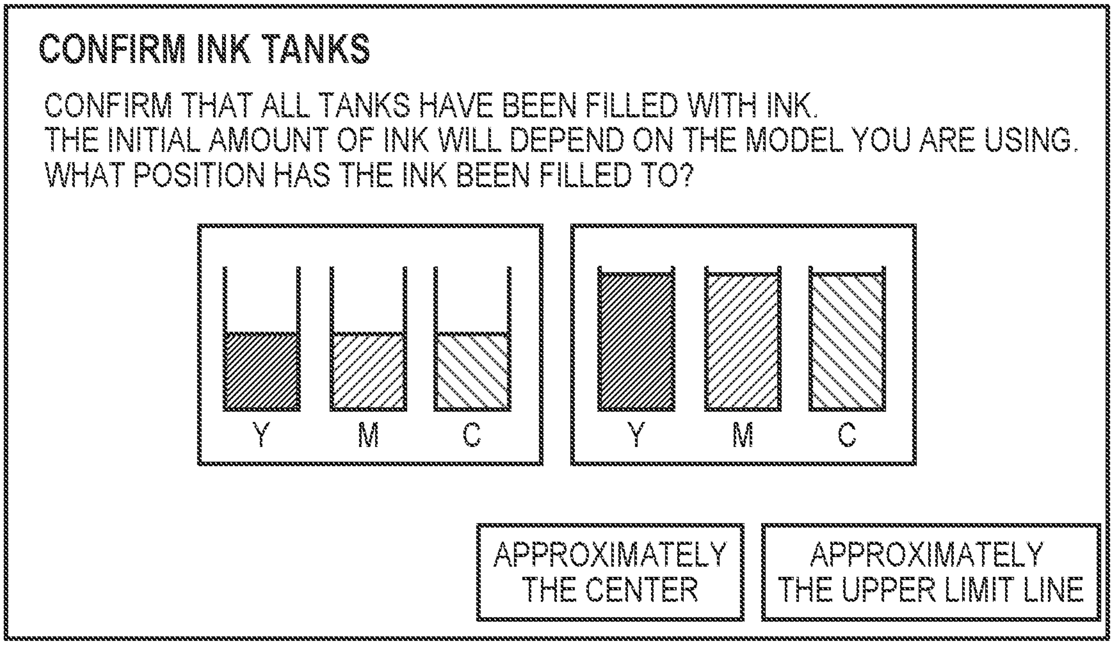
FIG. 16 is a view illustrating an example of a screen on which a user selects the ink consumption amount reset criteria.

In the ink consumption amount reset criteria 3022, flag information for determining whether to reset the ink consumption amount at a 100% ink consumption amount or to reset the ink consumption amount at a 50% ink consumption amount is stored. The flag information is optionally changed by the user. The user sets the flag information according to the ink capacity of the ink bottle to be purchased. Here, an example of the setting of the flag information by the user will be described. FIG. 16 is a view illustrating an example of a screen on which a user selects the ink consumption amount reset criteria. The screen of FIG. 16 is displayed on the operation panel 305 of the printer 300, various external terminals (not illustrated), or the like. On the screen, the message "Confirm that all tanks have been filled with ink. The initial amount of ink will depend on the model you are using. What position has the ink been filled to?" is displayed.

The user confirms the position of the ink liquid surface (specifically, the indicator 310 and the indicator 311) displayed in each ink tank, and presses a button of "approximately the center" or "approximately the upper limit line".

The CPU 341 stores a value 1 indicating a reset of the ink consumption amount at the 50% ink consumption amount in the ink consumption amount reset criteria 3022 when the user presses the button "approximately the center" on the screen. Meanwhile, the CPU 341 stores the value 0 indicating a reset of the ink consumption amount at the 100% ink consumption amount in the ink consumption amount reset criteria 3022 when the user presses the button "approximately the upper limit line" on the screen.

More specifically, flag information is used to determine whether the ink liquid surface in at the position of the indicator 310 or of the indicator 311 when the user injects ink into each ink tank. The initial value is value 0, but the invention is not particularly limited to this. In the present embodiment, the ink consumption amount reset criteria 3022 is not used, but the ink consumption amount reset criteria 3022 is used in the second embodiment.

The ink consumption amount reset count criteria 3023 is a criteria value for the number of ink consumption amount resets for determining whether the ink consumption amount is to be reset at 100% ink consumption amount or 50% ink consumption amount. More specifically, the ink consumption amount resetting method is changed by comparing the ink consumption amount reset count criteria 3023 with the ink consumption amount reset counts 3018 to 3021 of respective ink tanks. In the present embodiment, the ink consumption amount reset count is set to "1", but it may be a different value. Note that in the present embodiment, the ink consumption amount reset count criteria 3023 is not used, but in the third embodiment, the ink consumption amount reset count criteria 3023 is used.

The data structure of the ink consumption amount information 3000 is stored in the data memory 344 and initialized when the printer 300 is started. Then, the initialized ink consumption amount information 3000 is used. The value of each piece of data is stored in a non-volatile memory in which data is not erased even when the power of the printer 300 is disconnected.

Figure 8A:
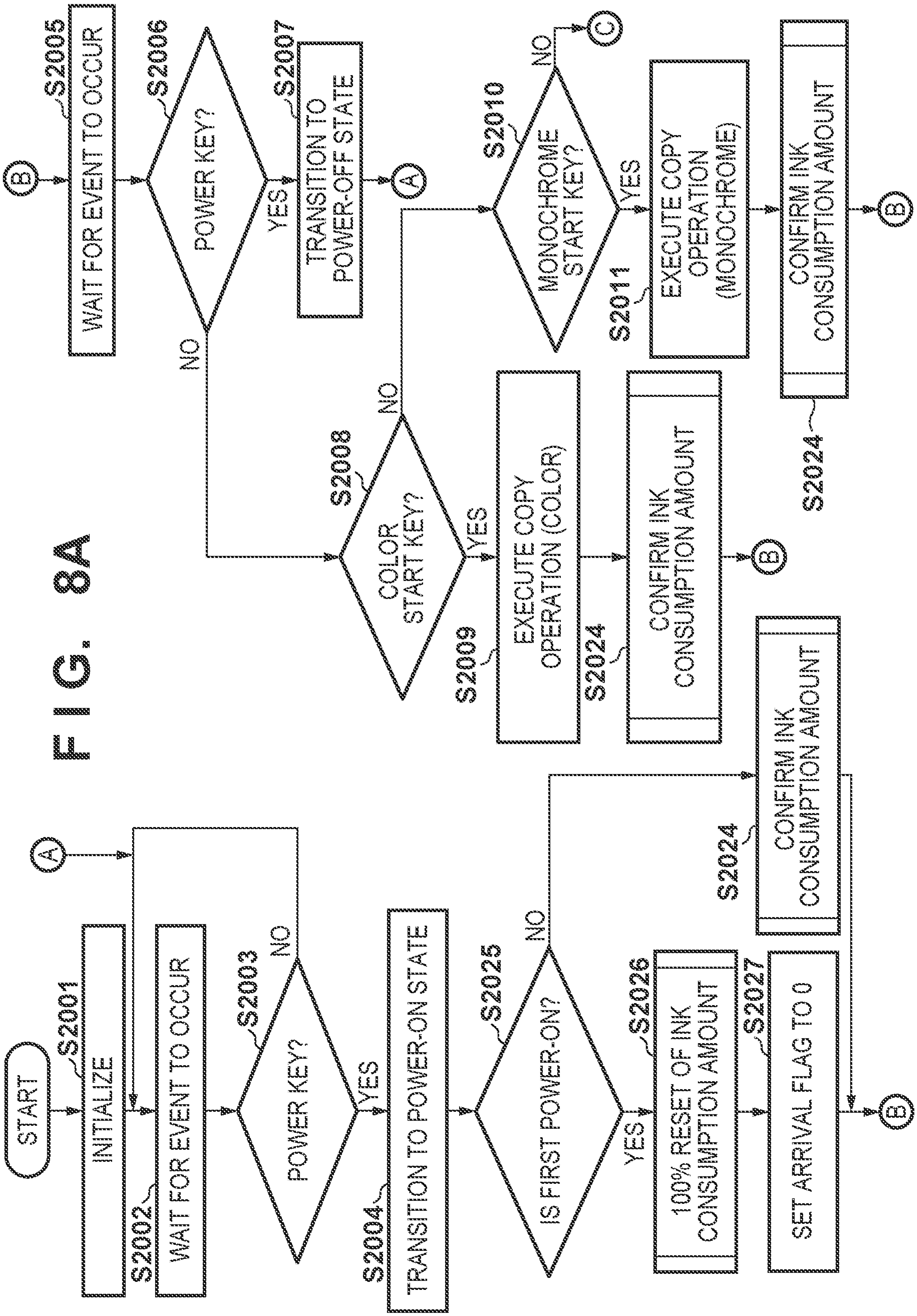
FIGS. 8A and 8B comprise a flowchart for describing processing of the printer.
Figure 8B:
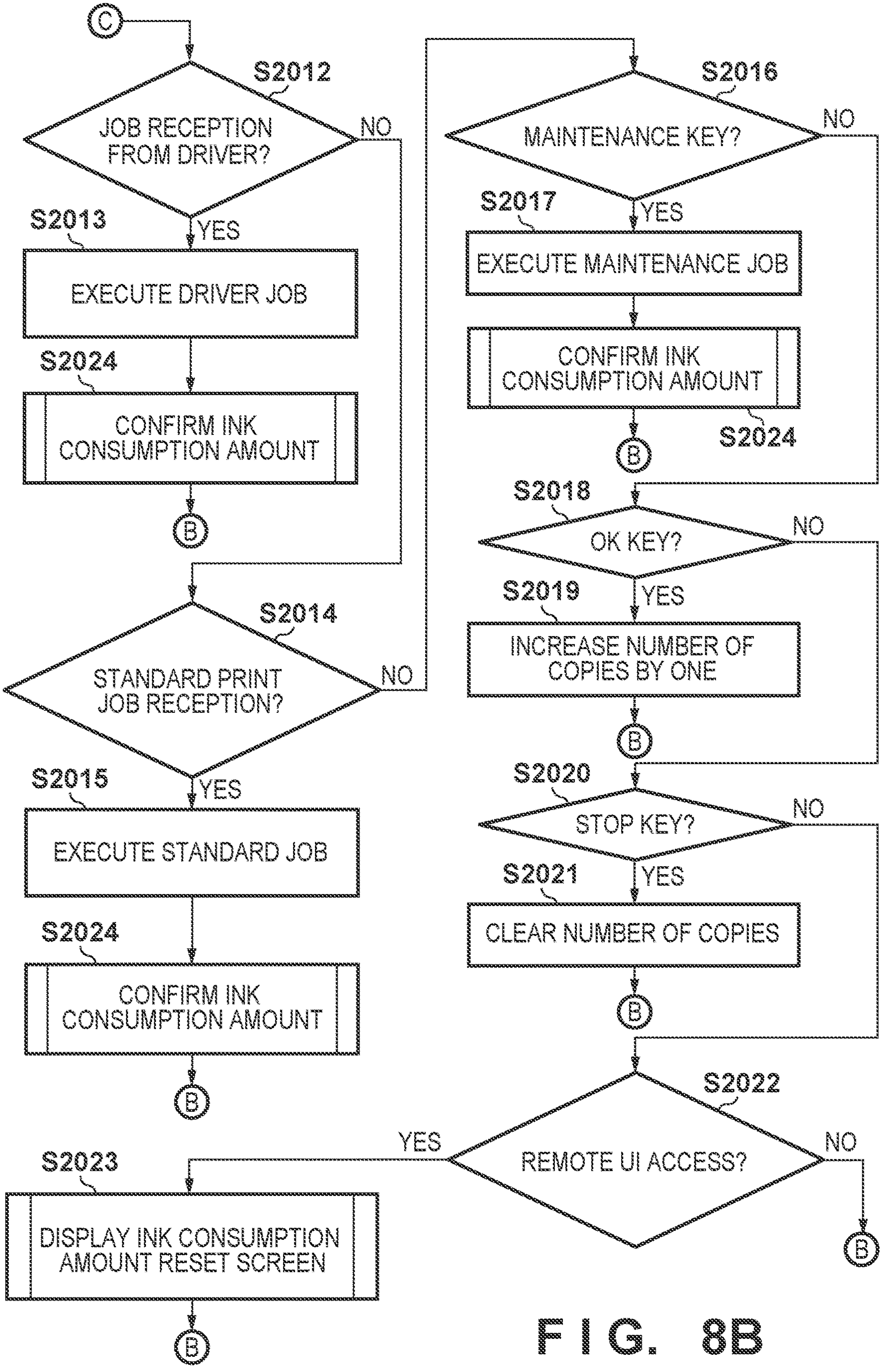

FIGS. 8A and 8B comprise a flowchart for describing processing of the printer. This process is executed by the CPU 341 of the printer 300 when AC power is supplied to the printer 300.

In step S2001, when the AC power is supplied to the printer 300, the CPU 341 performs an initialization process for hardware of each unit of the printer 300 and the data memory 344. Here, the printer 300 is in a power-off state of waiting for a power-on operation.

In step S2002, the CPU 341 waits until an event occurs in the power-off state. Here, examples of the event include the pressing of the power key 330 by the user. Hereinafter, the CPU 341 performs necessary processing according to the event that occurred.

In step S2003, the CPU 341 determines whether an event of the power key 330 being pressed has occurred. When the CPU 341 determines that an event of the power key 330 being pressed has occurred (Yes in step S2003), the processing proceeds to step S2004. Meanwhile, when the CPU 341 determines that an event of the power key 330 being pressed has not occurred (No in step S2003), the processing returns to step S2002.

In step S2004, the CPU 341 transitions to a power-on state.

In step S2025, the CPU 341 determines whether or not the transition to the current power-on state is the first time the power is turned on. If the CPU 341 determines that the transition to the current power-on state is the first time the power is turned on (Yes in step S2025), the processing proceeds to step S2026. Meanwhile, if the CPU 341 determines that the transition to the current power-on state is not the first time the power is turned on (No in step S2025), the processing proceeds to step S2024.

Specifically, the CPU 341 stores flag information for determining the first power-on in a non-volatile memory that is not erased even if the power of the printer 300 is disconnected, and confirms the flag information to determine whether the first power-on is performed. In the following, the first power-on is referred to as "arrival" and the flag for determining the first power-on is referred to as the "arrival flag". If the CPU 341 determines in step S2025 that the arrival flag is in an arrived state (value 0), the processing proceeds to step S2024. Meanwhile, if the CPU 341 determines that the arrival flag is in an arrival state (value 1), the processing proceeds to step S2026. The arrival flag being in the arrived state indicates that the power is in a state in which the user has already turned on the printer 300. Meanwhile, the arrival flag being in the arrival state indicates that the user has turned on the power of the printer 300 for the first time.

In step S2024, the CPU 341 confirms the ink consumption amount of the ink tanks.

In step S2026, the CPU 341 performs a process for a 100% reset of the ink consumption amount, which will be described later. The reset target is made to be all colors of ink. When the printer 300 purchased by the user arrives at the user's home or the like, the user often injects ink into the ink tanks using an ink bottle bundled with the printer 300. In the present embodiment, the ink bottle that is bundled with the printer 300 when it arrives at the user's home or the like is the large-capacity bottle 312. When the ink bottle bundled with the printer 300 is the small-capacity bottle 313, the CPU 341 may execute a process of a 50% ink consumption amount reset in step S2026.

If the CPU 341 in step S2027 sets the arrival flag to the arrived state (value 0), the processing proceeds to B. Thus, a value of 0 indicates that the arrival state has ended.

In step S2005, the CPU 341 waits until an event occurs in the power-on state. Events that occur in the power-on state include a key operation on the operation panel 305 by the user, a reception of job data from an external apparatus via a network or near-field communication, a remote UI access request from an external apparatus to the Web server module 1334 of the printer 300, and the like. Hereinafter, the CPU 341 performs necessary processing according to the event that occurred.

In step S2006, the CPU 341 determines whether an event of the power key 330 being pressed has occurred. When the CPU 341 determines that an event of the power key 330 being pressed has occurred (Yes in step S2006), the processing proceeds to step S2007. Meanwhile, when the CPU 341 determines that an event of the power key 330 being pressed has not occurred (No in step S2006), the processing proceeds to step S2008.

In step S2007, the CPU 341 transitions to the power-off state of the printer 300.

In step S2008, the CPU 341 determines whether an event of the color start key 334 being pressed has occurred. When the CPU 341 determines that an event of the color start key 334 being pressed has occurred (Yes in step S2008), the processing proceeds to step S2009. Meanwhile, when the CPU 341 determines that an event of the color start key 334 being pressed has not occurred (No in step S2008), the processing proceeds to step S2010.

In step S2009, the CPU 341 performs a process of performing a color copy.

In step S2010, the CPU 341 determines whether an event of the monochrome start key 333 being pressed has occurred. When the CPU 341 determines that an event of the monochrome start key 333 being pressed has occurred (Yes in step S2010), the processing proceeds to step S2011. Meanwhile, when the CPU 341 determines that an event of the monochrome start key 333 being pressed has not occurred (No in step S2010), the processing proceeds to step S2012.

In step S2011, the CPU 341 performs a process of performing a monochrome copy.

In step S2012, the CPU 341 determines whether an event of job data reception from a custom print driver of an external apparatus has occurred. When the CPU 341 determines that an event of job data reception from a custom print driver of an external apparatus has occurred (Yes in step S2012), the processing proceeds to step S2013. Meanwhile, when the CPU 341 determines that an event of job data reception from a custom print driver of the external apparatus has not occurred (No in step S2012), the processing proceeds to step S2014.

In step S2013, the CPU 341 performs a process of executing a driver job.

In step S2014, the CPU 341 determines whether an event of job data reception from a standard print service of an external apparatus has occurred. When the CPU 341 determines that an event of job data reception from a standard print service of an external apparatus has occurred (Yes in step S2014), the processing proceeds to step S2015. Meanwhile, when the CPU 341 determines that an event of job data reception from a standard print service of the external apparatus has not occurred (No in step S2014), the processing proceeds to step S2016.

In step S2015, the CPU 341 performs a process of executing a standard job.

In step S2016, the CPU 341 determines whether an event of the maintenance key 337 being pressed has occurred. When the CPU 341 determines that an event of the maintenance key 337 being pressed has occurred (Yes in step S2016), the processing proceeds to step S2017. Meanwhile, when the CPU 341 determines that an event of the maintenance key 337 being pressed has not occurred (No in step S2016), the processing proceeds to step S2018.

In step S2017, the CPU 341 performs a process of performing a maintenance job. Although not illustrated, as a process of executing a maintenance job, the CPU 341 transitions to the state of waiting for execution of the maintenance job described above, and waits until there is an event of the maintenance key 337, the color start key 334, or the monochrome start key 333 being pressed. When an event of the maintenance key 337 being pressed occurs, the CPU 341 counts the number of times the maintenance key 337 has been pressed. The CPU 341 executes the maintenance job when an event of the color start key 334 or the monochrome start key 333 being pressed has occurred. The maintenance job to be executed may be changed in accordance with the number of times the maintenance key 337 has been pressed.

In step S2018, the CPU 341 determines whether an event of the OK key 338 being pressed has occurred. When the CPU 341 determines that an event of the OK key 338 being pressed has occurred (Yes in step S2018), the processing proceeds to step S2019. Meanwhile, when the CPU 341 determines that an event of the OK key 338 being pressed has not occurred (No in step S2018), the processing proceeds to step S2020.

In step S2019, the CPU 341 increments the number display unit 332 by 1. This number of copies is used when the printer 300 executes a copy operation.

In step S2020, the CPU 341 determines whether an event of the stop key 335 being pressed has occurred. When the CPU 341 determines that an event of the stop key 335 being pressed has occurred (Yes in step S2020), the processing proceeds to step S2021. Meanwhile, when the CPU 341 determines that an event of the stop key 335 being pressed has not occurred (No in step S2020), the processing proceeds to step S2022.

In step S2021, the CPU 341 clears the setting of the number display unit 332 and sets 1 as the initial value.

In step S2022, the CPU 341 determines whether an event of a remote UI access request from a Web browser of an external apparatus to the Web server module 1334 of the printer 300 has occurred. In a case where the CPU 341 determines that an event of a remote UI access request from a Web browser of an external apparatus to the Web server module 1334 of the printer 300 has occurred (Yes in step S2022), the processing proceeds to step S2023. Meanwhile, in a case where the CPU 341 determines that an event of a remote UI access request from a Web browser of an external apparatus to the Web server module 1334 of the printer 300 has not occurred (No in step S2022), the processing returns to B.

In step S2023, the CPU 341 performs processing for displaying an ink consumption amount reset screen, which will be described later.

After the processing of step S2009 or step S2011 or the processing of step S2013, step S2015, or step S2017, which consume the ink of the ink tanks of the respective colors, the ink consumption amounts 3006 to 3009 of the ink consumption amount information 3000 illustrated in FIG. 7A to 7B are updated.

In step S2024, the CPU 341 performs a process for confirming the ink consumption amount, which will be described later. The CPU 341 notifies the user of an ink outage error in a case where the ink consumption amounts 3006 to 3009 of the ink consumption amount information 3000 respectively match or exceed the ink outage error criteria consumption amounts 3014 to 3017.

Figure 9:
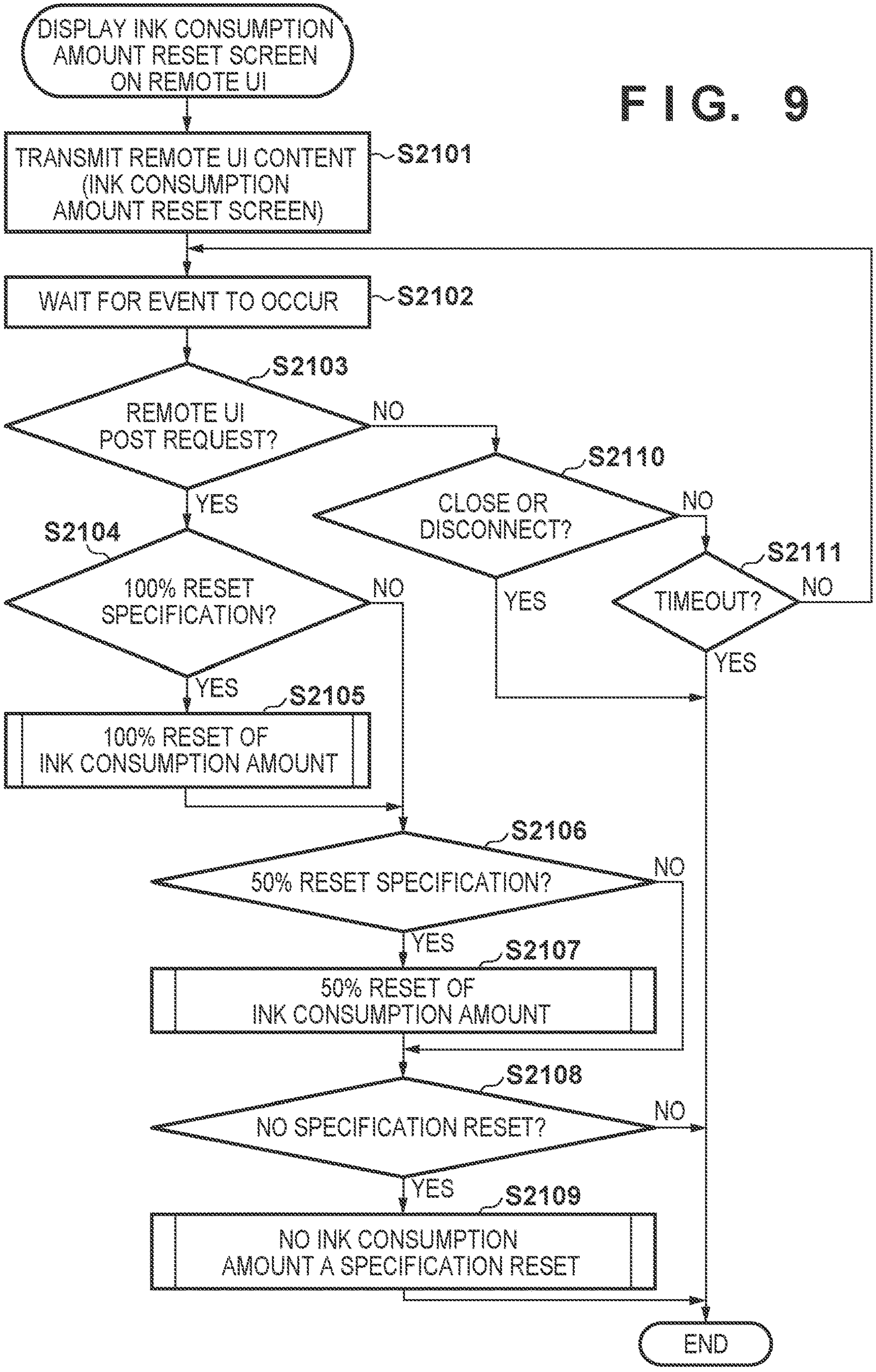
FIG. 9 is a flowchart for describing processing of the printer when displaying an ink consumption amount reset screen to the remote UI.

FIG. 9 is a flowchart for describing processing of the printer when displaying an ink consumption amount reset screen to the remote UI. This process is performed as a subflow of step S2023 of the flowchart of FIG. 8B.

In step S2101, the CPU 341 returns a response to the remote UI access request from a Web browser of an external apparatus to the Web server module 1334 of the printer 300. The content of the response is the content of the screen 600 illustrated in FIG. 4.

In step S2102, the CPU 341 waits until an event occurs. Here, the event to be monitored is a request from an external apparatus, a closing or disconnection of a session, a timeout, or the like. Hereinafter, the CPU 341 performs necessary processing according to the event that occurred.

In step S2103, the CPU 341 determines whether an event of a POST request to a remote UI from an external apparatus has occurred. When the CPU 341 determines that an event of a POST request to a remote UI from an external apparatus has occurred (Yes in step S2103), the processing proceeds to step S2104. Meanwhile, when the CPU 341 determines that an event of a POST request to a remote UI from an external apparatus has not occurred (No in step S2103), the processing proceeds to step S2110.

In step S2104, the CPU 341 determines whether or not an instruction for a 100% reset of the ink consumption amount of any of the ink colors is included in the content of the POST request. Specifically, the type of the ink consumption amount reset function selected when the user presses the OK button 606 on the remote UI screen 600 is described in the POST request. When the CPU 341 determines that an instruction for a 100% reset of the ink consumption amount of any of the ink colors is included as a result of confirming the content of the POST request (Yes in step S2104), the processing proceeds to step S2105. Meanwhile, when the CPU 341 determines that an instruction for a 100% reset of the ink consumption amount of any of the ink colors is not included as a result of confirming the content of the POST request (No in step S2104), the processing proceeds to step S2106.

In step S2105, the CPU 341 performs 100% reset processing of the ink consumption amount, which will be described later.

In step S2106, the CPU 341 determines whether or not an instruction for a 50% reset of the ink consumption amount of any of the ink colors is included as the result of confirming the content of the POST request. When the CPU 341 determines that an instruction for a 50% reset of the ink consumption amount of any of the ink colors is included as a result of confirming the content of the POST request (Yes in step S2106), the processing proceeds to step S2107. Meanwhile, when the CPU 341 determines that an instruction for a 50% reset of the ink consumption amount of any of the ink colors is not included as a result of confirming the content of the POST request (No in step S2106), the processing proceeds to step S2108.

In step S2107, the CPU 341 performs 50% reset processing of the ink consumption amount, which will be described later.

In step S2108, the CPU 341 determines whether or not an instruction for a reset that does not specify a 100% reset or a 50% reset of the ink consumption amount of any of the ink colors is included as the result of confirming the content of the POST request. In a case where the CPU 341 determines that an instruction for a reset that is not a specification of a 100% reset or a 50% reset of the ink consumption amount of any of the ink colors is included as the result of confirming the content of the POST request (Yes in step S2108), the processing proceeds to step S2109. Meanwhile, in a case where the CPU 341 determines that an instruction for a reset that does not specify a 100% reset or a 50% reset of the ink consumption amount of any of the ink colors is not included as the result of confirming the content of the POST request (No in step S2108), the processing ends.

In step S2109, the CPU 341 performs a reset without specification of the ink consumption amount, which will be described later, and the processing ends.

Note that the present embodiment does not perform the processing of step S2109. In contrast, the second and third embodiments execute the processing of step S2109.

The CPU 341 stores a result of confirming the content of the POST request in the data memory 344 of the printer 300 and refers to it when executing a process of a flowchart to be described later.

In step S2110, the CPU 341 determines whether an event of the session being closed or disconnected has occurred. When the CPU 341 determines that an event of the session being closed or disconnected has occurred (Yes in step S2110), the process of resetting the ink consumption amount is ended. Meanwhile, when the CPU 341 determines that an event of the session being closed or disconnected has not occurred (No in step S2110), the processing proceeds to step S2111.

In step S2111, the CPU 341 determines whether an event of a timeout has occurred. When the CPU 341 determines that a timeout event has occurred (Yes in step S2111), the processing of resetting the ink consumption amount is ended. Meanwhile, when the CPU 341 determines that an event of a timeout has not occurred (No in step S2111), the processing returns to step S2102. The timeout event is an event that occurs due to timer processing inside the printer 300 when communication from an external apparatus is not performed within a predetermined time.

Figure 10:
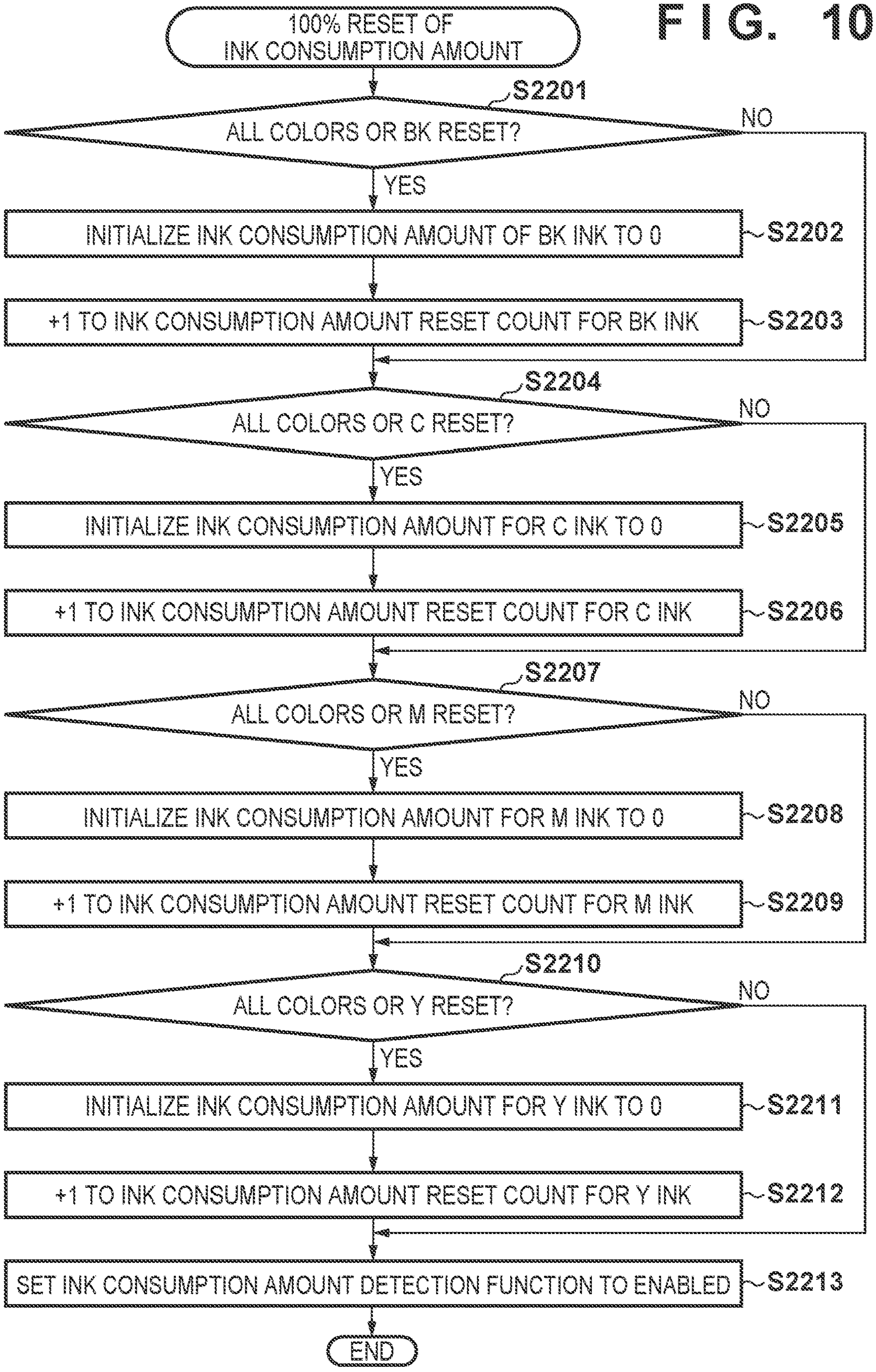
FIG. 10 is a flowchart for describing processing of the printer when executing processing for 100% resetting the ink consumption amount.

FIG. 10 is a flowchart for describing processing of the printer when executing processing for 100% resetting the ink consumption amount. This process is performed as a subflow of step S2105 of the flowchart of FIG. 9.

In step S2201, the CPU 341 refers to the content of the POST request stored in the data memory 344. The CPU 341 determines whether or not the content of the POST request indicates that the target of resetting the ink consumption amount is the ink of all colors or BK ink. When the CPU 341 determines that the content of the POST request indicates that the target of resetting the ink consumption amount is the ink of all colors or BK ink (Yes in step S2201), the processing proceeds to step S2202. Meanwhile, when the CPU 341 determines that the content of the POST request does not indicate that the target of resetting the ink consumption amount is the ink of all colors or BK ink (No in step S2201), the processing proceeds to step S2204.

In step S2202, the CPU 341 initializes the ink consumption amount 3006 of BK ink included in BK ink data set 3002 of the ink consumption amount information 3000 to 0.

In step S2203, the CPU 341 updates (+1) the ink consumption amount reset count of BK ink.

In step S2204, the CPU 341 determines whether or not the content of the POST request indicates that the target of resetting the ink consumption amount is the ink of all colors or C ink. When the CPU 341 determines that the content of the POST request indicates that the target of resetting the ink consumption amount is the ink of all colors or C ink (Yes in step S2204), the processing proceeds to step S2205. Meanwhile, when the CPU 341 determines that the content of the POST request does not indicate that the target of resetting the ink consumption amount is the ink of all colors or C ink (No in step S2204), the processing proceeds to step S2207.

In step S2205, the CPU 341 initializes the ink consumption amount 3007 of C ink included in C ink data set 3003 of the ink consumption amount information 3000 to 0.

In step S2206, the CPU 341 updates (+1) the ink consumption amount reset count of C ink.

In step S2207, the CPU 341 determines whether or not the content of the POST request indicates that the target of resetting the ink consumption amount is the ink of all colors or M ink. When the CPU 341 determines that the content of the POST request indicates that the target of resetting the ink consumption amount is the ink of all colors or M ink (Yes in step S2207), the processing proceeds to step S2208. Meanwhile, when the CPU 341 determines that the content of the POST request does not indicate that the target of resetting the ink consumption amount is the ink of all colors or M ink (No in step S2207), the processing proceeds to step S2210.

In step S2208, the CPU 341 initializes the ink consumption amount 3008 of M ink included in M ink data set 3004 of the ink consumption amount information 3000 to 0.

In step S2209, the CPU 341 updates (+1) the ink consumption amount reset count of M ink.

In step S2210, the CPU 341 determines whether or not the content of the POST request indicates that the target of resetting the ink consumption amount is the ink of all colors or Y ink. When the CPU 341 determines that the content of the POST request indicates that the target of resetting the ink consumption amount is the ink of all colors or Y ink (Yes in step S2210), the processing proceeds to step S2211. Meanwhile, when the CPU 341 determines that the content of the POST request does not indicate that the target of resetting the ink consumption amount is the ink of all colors or Y ink (No in step S2210), the processing proceeds to step S2213.

In step S2211, the CPU 341 initializes the ink consumption amount 3009 of Y ink included in Y ink data set 3005 of the ink consumption amount information 3000 to 0.

In step S2212, the CPU 341 updates (+1) the ink consumption amount reset count of Y ink.

In step S2213, the CPU 341 changes the value of the ink consumption amount detection function 3001 of the ink consumption amount information 3000 to 1, and sets the ink consumption amount detection function 3001 to be enabled. By setting the ink consumption amount detection function to be enabled, the CPU 341 will execute counting of the ink consumption amount.

Figure 11:
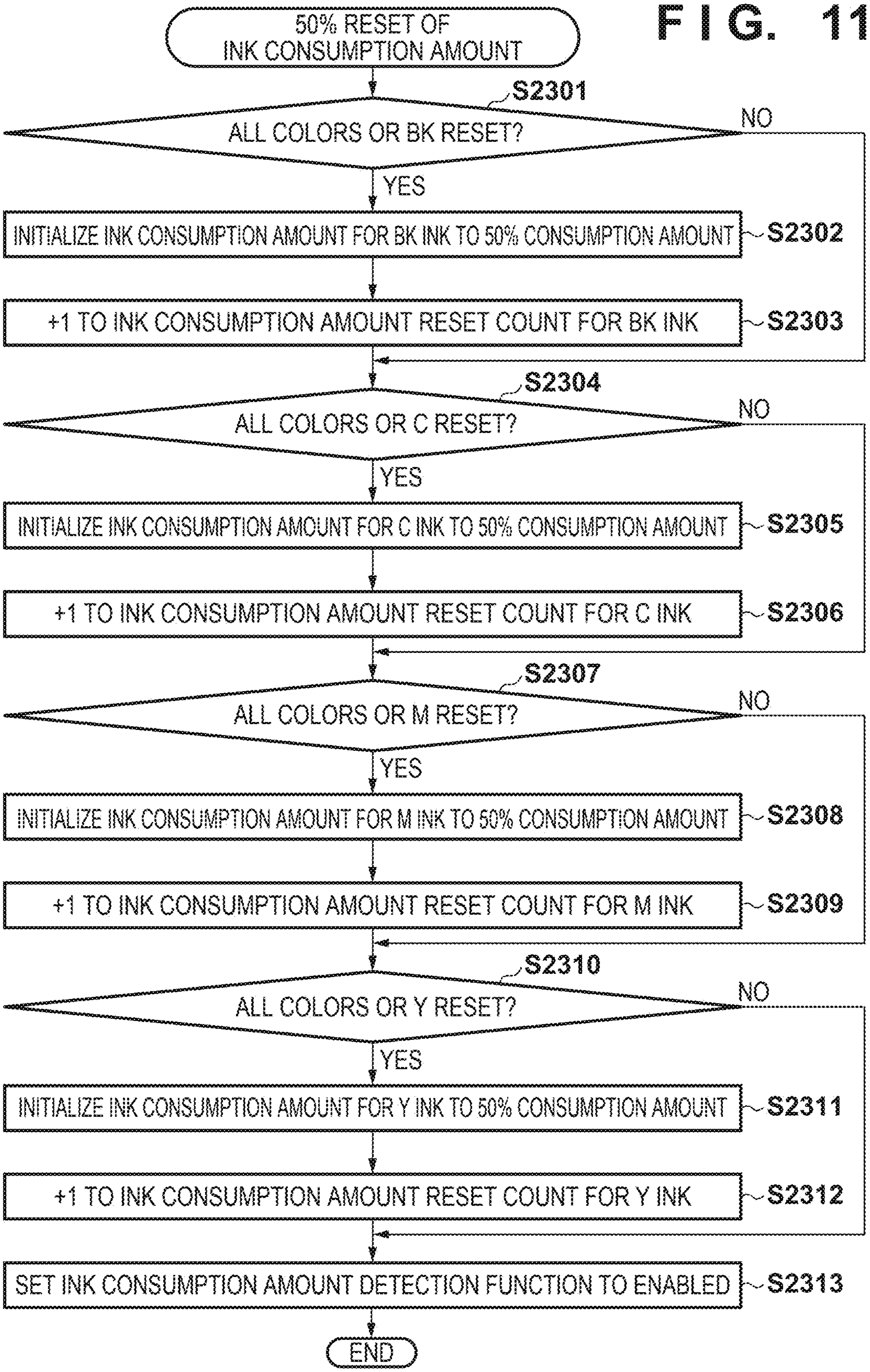
FIG. 11 is a flowchart for describing processing of the printer when executing processing for 50% resetting the ink consumption amount.

FIG. 11 is a flowchart for describing processing of the printer when executing processing for 50% resetting the ink consumption amount. This process is performed as a subflow of step S2107 of the flowchart of FIG. 9.

In step S2301, the CPU 341 refers to the content of the POST request stored in the data memory 344. The CPU 341 determines whether or not the content of the POST request indicates that the target of resetting the ink consumption amount is the ink of all colors or BK ink. When the CPU 341 determines that the content of the POST request indicates that the target of resetting the ink consumption amount is the ink of all colors or BK ink (Yes in step S2301), the processing proceeds to step S2302. Meanwhile, when the CPU 341 determines that the content of the POST request does not indicate that the target of resetting the ink consumption amount is the ink of all colors or BK ink (No in step S2301), the processing proceeds to step S2304.

In step S2302, the CPU 341 initializes the ink consumption amount 3006 of BK ink included in BK ink data set 3002 of the ink consumption amount information 3000 to the value of the 50% ink consumption amount 3010 for BK ink.

In step S2303, the CPU 341 updates (+1) the ink consumption amount reset count of BK ink.

In step S2304, the CPU 341 refers to the content of the POST request stored in the data memory 344. The CPU 341 determines whether or not the content of the POST request indicates that the target of resetting the ink consumption amount is the ink of all colors or C ink. When the CPU 341 determines that the content of the POST request indicates that the target of resetting the ink consumption amount is the ink of all colors or C ink (Yes in step S2304), the processing proceeds to step S2305. Meanwhile, when the CPU 341 determines that the content of the POST request does not indicate that the target of resetting the ink consumption amount is the ink of all colors or C ink (No in step S2304), the processing proceeds to step S2307.

In step S2305, the CPU 341 initializes the ink consumption amount 3007 of C ink included in C ink data set 3003 of the ink consumption amount information 3000 to the value of the 50% ink consumption amount 3011 for C ink.

In step S2306, the CPU 341 updates (+1) the ink consumption amount reset count of C ink.

In step S2307, the CPU 341 refers to the content of the POST request stored in the data memory 344. The CPU 341 determines whether or not the content of the POST request indicates that the target of resetting the ink consumption amount is the ink of all colors or M ink. When the CPU 341 determines that the content of the POST request indicates that the target of resetting the ink consumption amount is the ink of all colors or M ink (Yes in step S2307), the processing proceeds to step S2308. Meanwhile, when the CPU 341 determines that the content of the POST request does not indicate that the target of resetting the ink consumption amount is the ink of all colors or M ink (No in step S2307), the processing proceeds to step S2310.

In step S2308, the CPU 341 initializes the ink consumption amount 3008 of M ink included in M ink data set 3004 of the ink consumption amount information 3000 to the value a 50% ink consumption amount 3012 for M ink.

In step S2309, the CPU 341 updates (+1) the ink consumption amount reset count of M ink.

In step S2310, the CPU 341 refers to the content of the POST request stored in the data memory 344. The CPU 341 determines whether or not the content of the POST request indicates that the target of resetting the ink consumption amount is the ink of all colors or Y ink. When the CPU 341 determines that the content of the POST request indicates that the target of resetting the ink consumption amount is the ink of all colors or Y ink (Yes in step S2310), the processing proceeds to step S2311. Meanwhile, when the CPU 341 determines that the content of the POST request does not indicate that the target of resetting the ink consumption amount is the ink of all colors or Y ink (No in step S2310), the processing proceeds to step S2313.

In step S2311, the CPU 341 initializes the ink consumption amount 3009 of Y ink included in Y ink data set 3005 of the ink consumption amount information 3000 to the value of the 50% ink consumption amount 3013 for Y ink.

In step S2312, the CPU 341 updates (+1) the ink consumption amount reset count of Y ink.

In step S2313, the CPU 341 changes the value of the ink consumption amount detection function 3001 of the ink consumption amount information 3000 to 1, and sets the ink consumption amount detection function 3001 to be enabled. By setting the ink consumption amount detection function to be enabled, the CPU 341 will execute counting of the ink consumption amount.

Figure 12A:
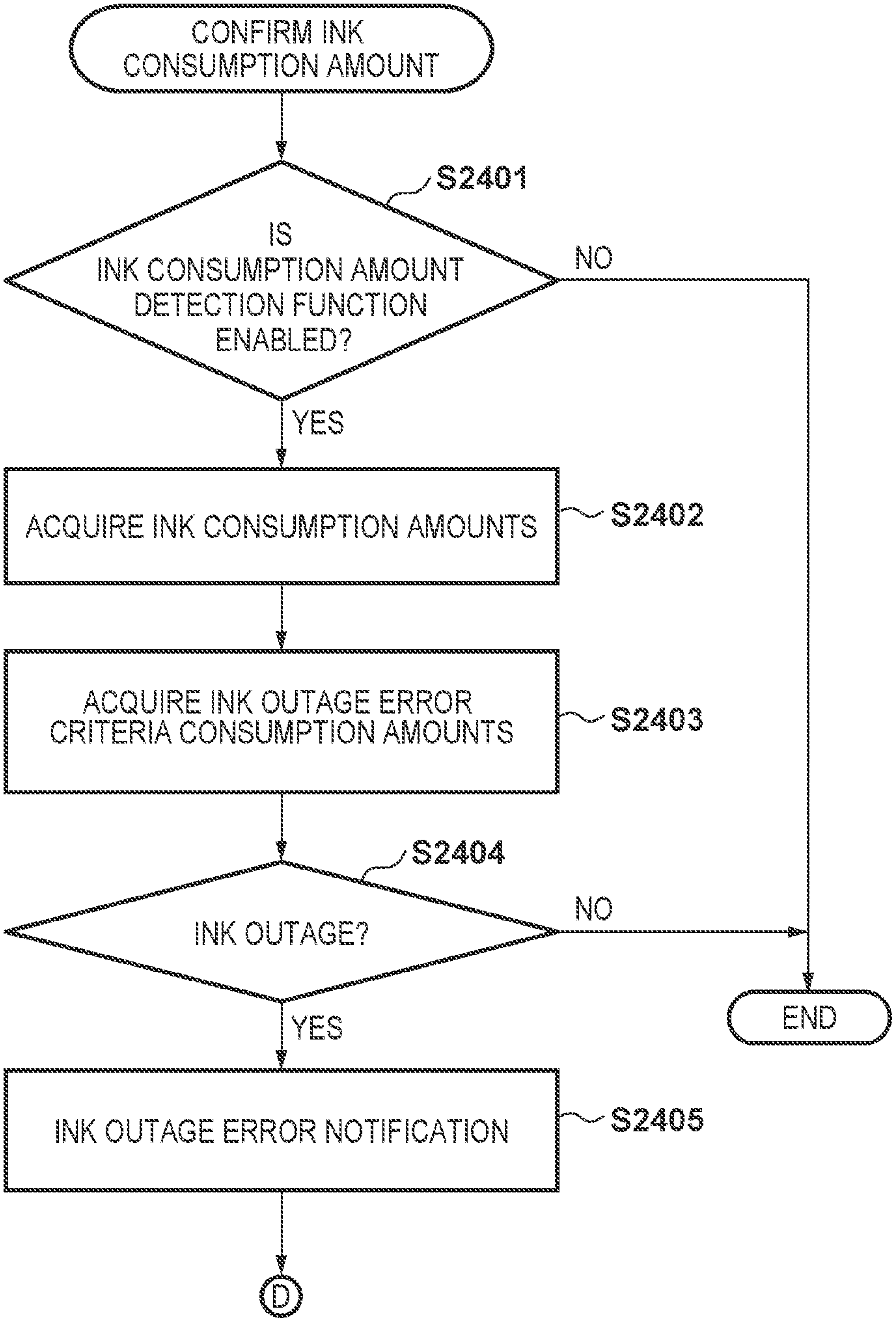
FIGS. 12A and 12B comprise a flowchart for describing details of processing for confirming an ink consumption amount.
Figure 12B:
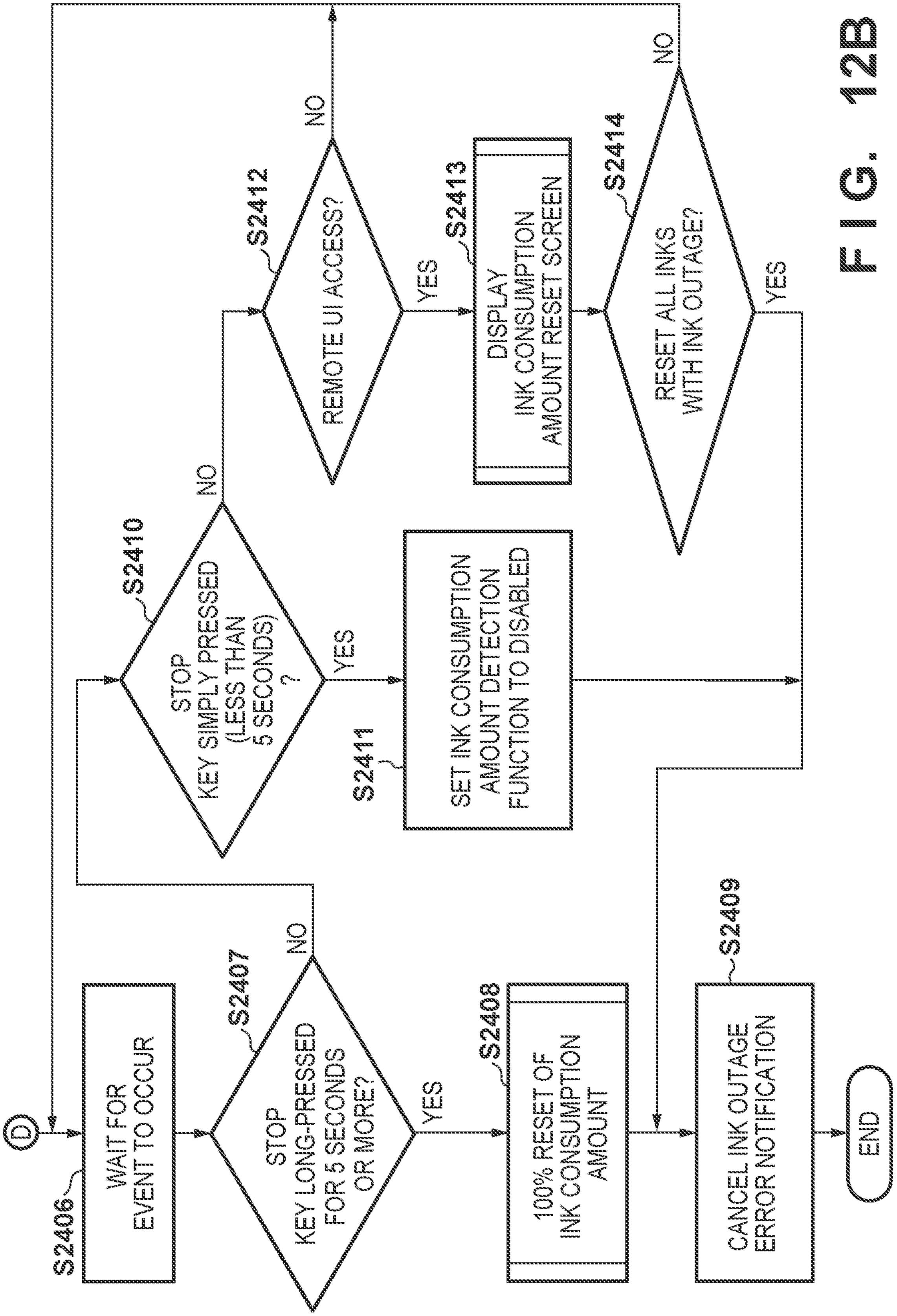

FIGS. 12A and 12B comprise a flowchart for describing details of processing for confirming an ink consumption amount. This process is performed as a subflow of step S2024 of the flowchart of FIG. 8B.

In step S2401, the CPU 341 refers to the content of the ink consumption amount detection function 3001 included in the ink consumption amount information 3000 illustrated in FIG. 7A. The CPU 341 determines whether or not the content of the ink consumption amount detection function 3001 includes the value 1. The value 1 indicates that the ink consumption amount detection function 3001 is enabled. If the CPU 341 determines that the content of the ink consumption amount detection function 3001 includes the value 1 (Yes in step S2401), the processing proceeds to step S2402. On the other hand, when the CPU 341 determines that the content of the ink consumption amount detection function 3001 does not include the value 1 (that is, the value is 0) (No in step S2401), the process ends.

In step S2402, the CPU 341 acquires the ink consumption amounts 3006 to 3009 of the respective ink colors included in the ink consumption amount information 3000 of FIG. 7A to 7B. The acquired values are temporarily stored in the data memory 344.

In step S2403, the CPU 341 acquires the ink outage error criteria consumption amounts 3014 to 3017 of the respective ink colors included in the ink consumption amount information 3000 of FIG. 7A to 7B. The acquired values are temporarily stored in the data memory 344.

In step S2404, the CPU 341 determines whether or not there is ink in each ink tank based on whether or not the acquired ink consumption amounts 3006 to 3009 of the respective ink colors are greater than or equal to the ink outage error criteria consumption amounts 3014 to 3017, respectively. The CPU 341 determines that there is ink in each ink tank in the case where the acquired ink consumption amounts 3006 to 3009 of the respective ink colors are less than the ink outage error criteria consumption amounts 3014 to 3017, respectively (No in step S2404), and ends the processing. Meanwhile, the CPU 341 determines that there is no ink in each ink tank in the case where the acquired ink consumption amounts 3006 to 3009 of the respective ink colors are greater than or equal to the ink outage error criteria consumption amounts 3014 to 3017 respectively (Yes in step S2404), and the processing proceeds to step S2405.

In step S2405, the CPU 341 notifies the user of an ink outage error. In the present embodiment, the CPU 341 notifies the occurrence of an error by blinking the error lamp 336. In addition, the CPU 341 controls turning on/off of the respective parts of the seven-segment LED of the number display unit 332 to notify the error number.

In step S2406, the CPU 341 waits until an event occurs. Here, the event is an operation of the stop key 335 by the user, a remote UI access, or the like. Hereinafter, the CPU 341 performs necessary processing according to the event that occurred.

In step S2407, the CPU 341 determines whether an event of the stop key 335 being long-pressed for 5 seconds or more has occurred. When the CPU 341 determines that an event of the stop key 335 being long-pressed for 5 seconds or more has occurred (Yes in step S2407), the processing proceeds to step S2408. Meanwhile, when the CPU 341 determines that an event of the stop key 335 being long-pressed for 5 seconds or more has not occurred (No in step S2407), the processing proceeds to step S2410.

In step S2408, the CPU 341 performs a process of 100% resetting the ink consumption amount as described with reference to FIG. 9. The ink color to be reset is an ink color for which the ink consumption amount is equal to or larger than the ink outage error criteria consumption amount. The CPU 341 may 100% reset the ink consumption amount of all the ink colors.

In step S2409, the CPU 341 cancels the notification of an ink outage error. For example, the CPU 341 ends the control of the error notification performed in step S2405 in the error lamp 336 and the number display unit 332.

In step S2410, the CPU 341 determines whether an event of the stop key 335 being simply pressed (an operation where the pressing time is less than 5 seconds) has occurred. When the CPU 341 determines that an event of the stop key 335 being simply pressed (an operation where the pressing time is less than 5 seconds) has occurred (Yes in step S2410), the processing proceeds to step S2411. Meanwhile, when the CPU 341 determines that an event of the stop key 335 being simply pressed (an operation where the pressing time is less than 5 seconds) has not occurred (No in step S2410), the processing proceeds to step S2412.

In step S2411, the CPU 341 changes the value of the ink consumption amount detection function 3001 included in the ink consumption amount information 3000 illustrated in FIG. 7A to 0 and the processing proceeds to step S2409. The value 0 indicates that the ink consumption amount detection function 3001 is disabled.

In step S2412, the CPU 341 determines whether or not an event of a remote UI access request from a Web browser (not shown) of an external apparatus to the Web server module 1334 of the printer 300 has occurred. In a case where the CPU 341 determines that an event of a remote UI access request from a Web browser (not shown) of an external apparatus to the Web server module 1334 of the printer 300 has occurred (Yes in step S2412), the processing proceeds to step S2413. Meanwhile, in a case where the CPU 341 determines that an event of a remote UI access request from a Web browser (not shown) of an external apparatus to the Web server module 1334 of the printer 300 has not occurred (No in step S2412), the processing returns to step S2406.

In step S2413, the CPU 341 performs control of displaying the ink consumption amount reset screen described with reference to FIG. 4 on the remote UI, and the processing proceeds to step S2414. In this way, processing for resetting the ink consumption amount of the ink color specified by the user is performed.

In step S2414, the CPU 341 determines whether or not the ink consumption amount of the ink color whose ink consumption amount is equal to or larger than the ink outage error criteria consumption amount has been reset. Specifically, the CPU 341 once again references the values of the ink consumption amounts 3006 to 3009 of the respective ink colors included in the ink consumption amount information 3000 of FIG. 7A to 7B. In a case where the CPU 341 determines that the ink consumption amounts 3006 to 3009 are not greater than or equal to the ink outage error criteria consumption amounts 3014 to 3017, respectively (Yes in step S2414), the processing proceeds to step S2409. Meanwhile, in a case where the CPU 341 determines that the ink consumption amounts 3006 to 3009 are greater than or equal to the ink outage error criteria consumption amounts 3014 to 3017, respectively (No in step S2414), the processing returns to step S2406.

In step S2406, the CPU 341 waits until an event of the stop key 335 being pressed has occurred, but the invention is not limited thereto. For example, the CPU 341 may wait until an operation on a key other than the stop key 335 occurs, or may wait until an event of the OK key 338 being pressed occurs. In addition, in a case where the operation panel 305 has a liquid crystal screen capable of graphic display or a touch panel function, the CPU 341 may indicate on the liquid crystal screen how to perform an operation to cancel the error when an ink outage error occurs. When the CPU 341 detects a user operation, it performs various controls.

By the CPU 341 performing the above control, it is possible to realize an ink consumption amount reset function corresponding to a plurality of types of ink bottles by using the remote UI screen 600.

Accordingly, the user can easily perform an ink consumption amount reset without performing a complicated operation when resetting the ink consumption amount according to the ink capacities of purchased ink bottles.

Note that, in the present embodiment, an example in which the user uses the remote UI screen 600 to reset the ink consumption amount is described, but the invention is not limited thereto. For example, the user may perform an ink consumption amount reset via an external apparatus such as the smart phone 500 or the client terminal 401 or the cloud server 200 via the Internet 104. For example, the screen 600 of FIG. 4 may be provided in a GUI of a custom print driver of the smart phone 500. In addition, an application for the smart phone 500 for resetting the ink consumption amount may be separately prepared, and the screen 600 of FIG. 4 may be provided on a GUI of the application. Further, the user may perform a reset of the ink consumption amount via the operation panel 305 of the printer 300. For example, in the process of step S2017 of FIG. 8B, the ink consumption amount reset can be realized by providing an ink consumption amount reset function in an executable maintenance job. At this time, the user does not need to input information related to a reset of the ink consumption amount at the time of executing the reset, and can perform the reset operation relatively easily.

Although the present embodiment assumes that the user purchases an ink bottle at a mass retailer, the invention is not limited to this. For example, the user may purchase an ink bottle by using a service (hereinafter referred to as an automatic ink delivery service) that automatically purchases and delivers the ink in a case where the ink consumption amount becomes equal to or larger than the ink outage error criteria consumption amount. There is often one type of ink bottle that can be purchased by the automatic ink delivery service. In a case where the printer 300 can determine that the user has purchased the ink by the automatic ink delivery service, one among a plurality of types of ink consumption amount reset functions suitable for an ink bottle that can be purchased by the automatic ink delivery service may be executed. For example, when the printer 300 determines that the user has purchased the large-capacity bottle 312 by the automatic ink delivery service, the printer 300 stores a value 0 indicating a reset at 100% ink consumption amount in the ink consumption amount reset criteria 3022. Meanwhile, when the printer 300 determines that the user has purchased the small-capacity bottle 313 by the automatic ink delivery service, the printer 300 stores a value 1 indicating reset at 50% ink consumption amount in the ink consumption amount reset criteria 3022. In addition, in order for the user to execute the ink consumption amount reset function via the operation panel 305, the client terminal 401, or the display unit of the smart phone 500, a reset function suitable for an ink bottle that can be purchased by the automatic ink delivery service may be displayed on the screen.

Second Embodiment

In the first embodiment, the printer 300 presents the user with a function for resetting the ink consumption amounts corresponding to a plurality of ink bottles (large capacity or small capacity). Then, the user selects an ink consumption amount reset function suitable for the purchased ink bottles, and causes the printer 300 to execute a reset of the ink consumption amounts. In the second embodiment, ink bottles to be purchased by the user are set in advance, and the ink consumption amounts are reset according to the set content. Thus, an example in which the ink consumption amount reset is easily executed will be described below.

Figure 13:
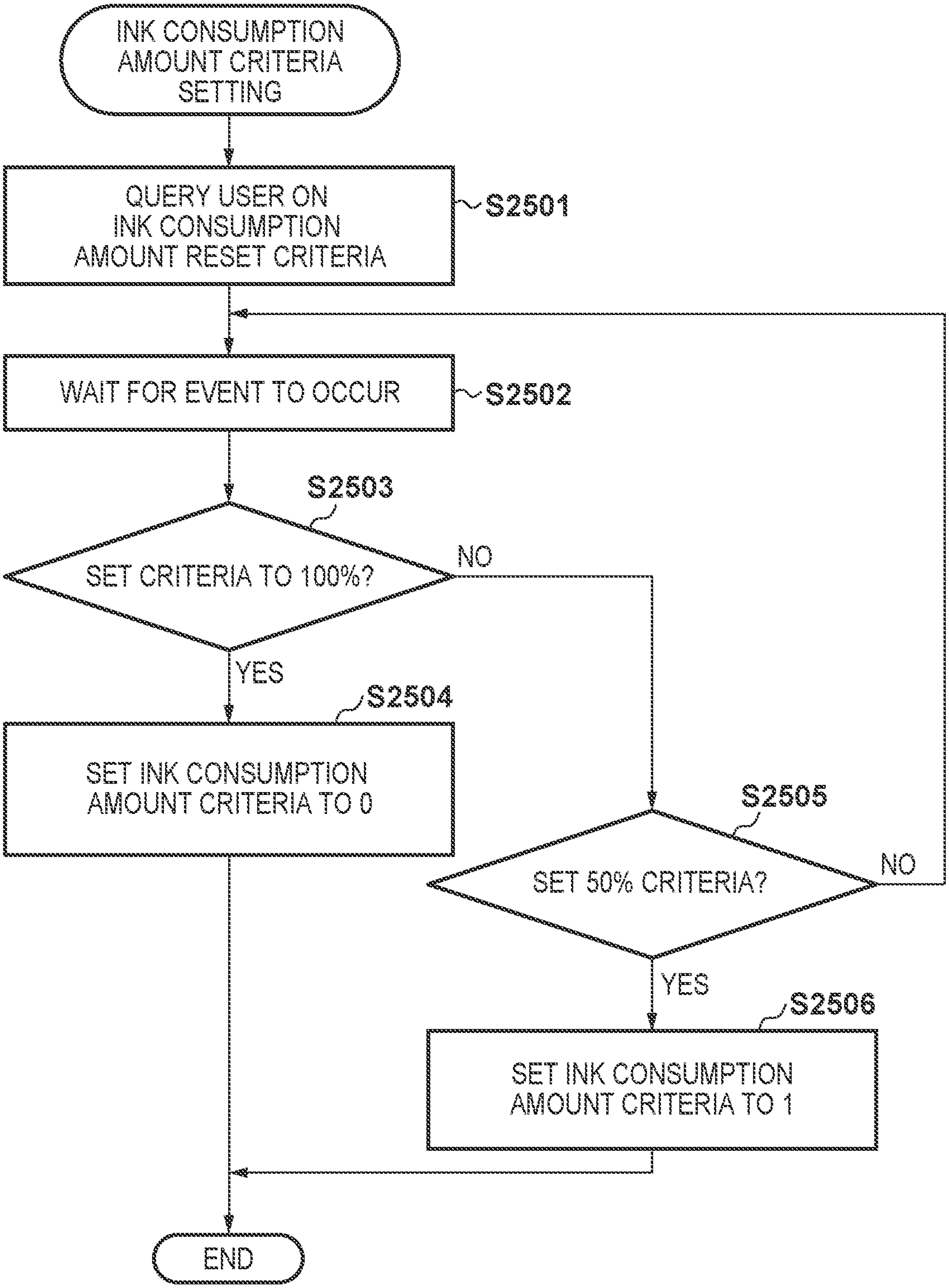
FIG. 13 is a flowchart for describing processing of the printer when setting a criteria value for resetting the ink consumption amount.

FIG. 13 is a flowchart for describing processing of the printer when setting a criteria value for resetting an ink consumption amount. This processing, which is not illustrated, is performed before step S2026 of FIG. 8A. Further, the processing may be performed as one of the maintenance jobs of step S2017 of FIG. 8B.

In step S2501, the CPU 341 queries the user about the reset criteria of the ink consumption amount. For example, the CPU 341 transmits remote UI content (a screen corresponding to the operation panel 305) to the client terminal 401 or the smart phone 500 connected to the local area network 102 to make the above-described query to the user. Note that the present embodiment may include a mode in which the user is not queried about the reset criteria of the ink consumption amount. For example, reset criteria of the ink consumption amount may be set in advance in accordance with a sales mode of the printer 300 (a mode in which the large-capacity bottle 312 or the small capacity bottle 313 is packaged with the printer 300 and sold by a mass retailer). Accordingly, it is possible to omit the time and effort for the user to select the reset criteria of the ink consumption amount.

In step S2502, the CPU 341 waits until an event occurs. For example, the event is a POST request from the client terminal 401 or the smart phone 500. Hereinafter, the CPU 341 performs necessary processing according to the event that occurred.

In step S2503, the CPU 341 confirms the content of the event that has occurred. The CPU 341 determines whether or not the content of the event that occurred includes an event that can be regarded as a selection of 100% reset of an ink consumption amount (for example, an operation of the user determining the ink consumption amount reset amounts of the respective ink colors on the screen 600). If the CPU 341 determines that the content of the event that occurred includes an event that can be regarded as a selection of 100% reset of the ink consumption amount (Yes in step S2503), the processing proceeds to step S2504. Meanwhile, if the CPU 341 determines that the content of the event that occurred does not include an event that can be regarded as a selection of 100% reset of an ink consumption amount (No in step S2503), the processing proceeds to step S2505.

In step S2504, the CPU 341 sets the value of the ink consumption amount reset criteria 3022 included in the ink consumption amount information 3000 to 0, and ends the process.

In step S2505, the CPU 341 determines whether or not the content of the event that has occurred includes an event that can be regarded as a selection of 50% reset of the ink consumption amount. If the CPU 341 determines that the content of the event that occurred includes an event that can be regarded as a selection of 50% reset of an ink consumption amount (Yes in step S2505), the processing proceeds to step S2506. Meanwhile, if the CPU 341 determines that the content of the event that occurred does not include an event that can be regarded as a selection of 50% reset of an ink consumption amount (No in step S2505), the processing returns to step S2502.

In step S2506, the CPU 341 sets the value of the ink consumption amount reset criteria 3022 included in the ink consumption amount information 3000 to 1, and ends the process.

Figure 14:
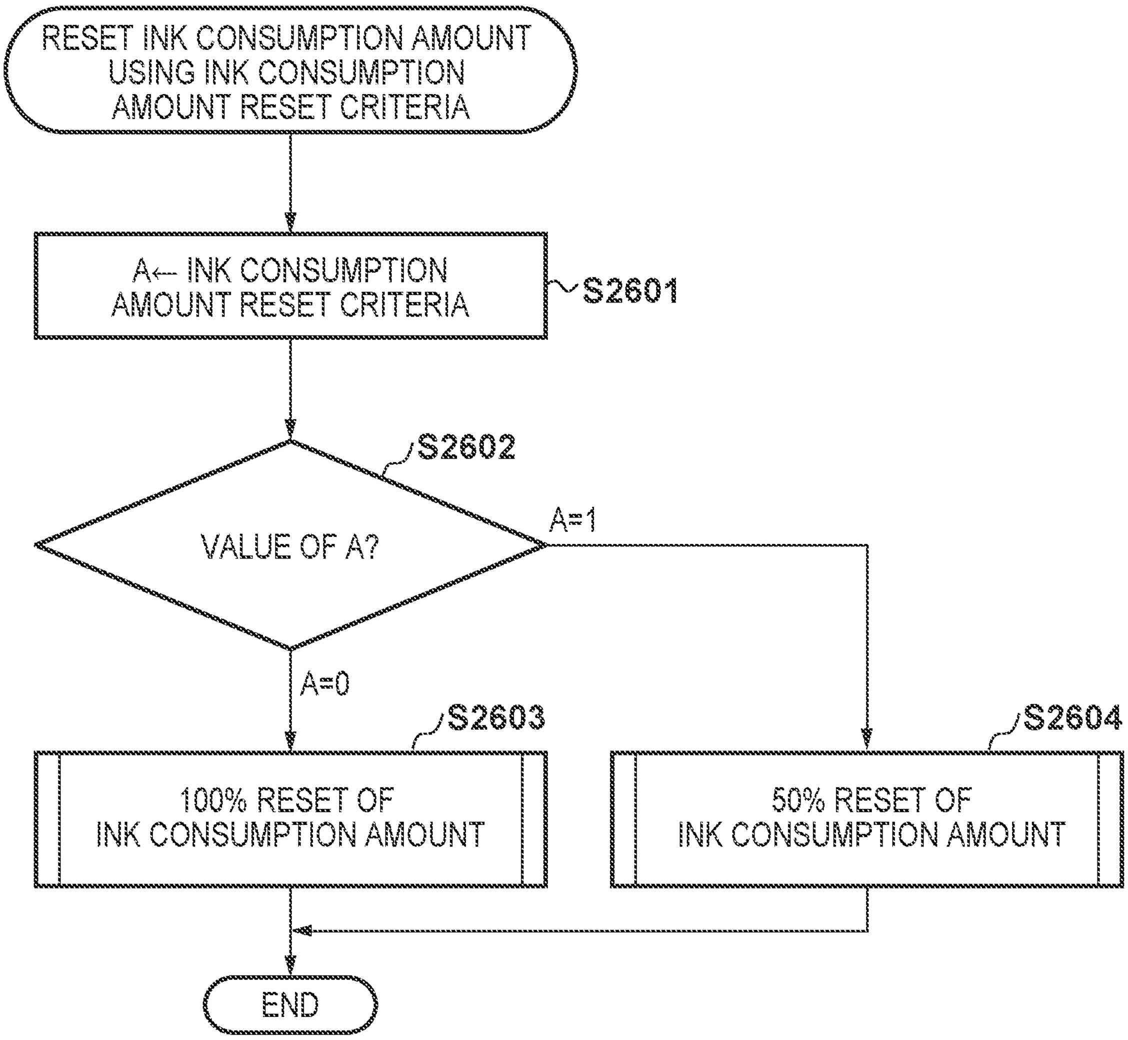
FIG. 14 is a flowchart for describing processing by the printer for when performing a reset of an ink consumption amount using ink consumption amount reset criteria.

FIG. 14 is a flowchart for describing processing by the printer for when performing a reset of an ink consumption amount using the ink consumption amount reset criteria. This process is executed instead of the 100% reset process for the ink consumption amount in step S2026 of FIG. 8A. In addition, the process is performed as a subflow of step S2109 of FIG. 9. Note that the content transmitted in the process of step S2101 of FIG. 9 may be a screen that differs from the ink consumption amount reset screen illustrated in FIG. 4. This screen may be, for example, a screen in which only options to reset all colors and to reset each ink color are displayed rather than allowing the user to select either a 100% ink consumption amount reset or a 50% ink consumption amount reset.

In step S2601, the CPU 341 acquires the ink consumption amount reset criteria 3022 included in the ink consumption amount information 3000, and stores it in a variable A within a work area.

In step S2602, the CPU 341 confirms the value of A in the work area. If the value of A is 0, the CPU 341 advances the processing to step S2603. Meanwhile, if the value of A is 1, the CPU 341 advances the processing to step S2604.

In step S2603, the CPU 341 performs a process of 100% resetting the ink consumption amount as illustrated in FIG. 10.

In step S2604, the CPU 341 performs a process of 50% resetting the ink consumption amount as illustrated in FIG. 11.

As described above, since the type of ink bottle purchased by the user can be set, the printer 300 can execute the ink consumption amount reset function using the set criteria value of the ink consumption amount. This eliminates the need for the user to select the ink consumption amount reset function every time, and makes it easier to execute the ink consumption amount reset.

In FIG. 13, the CPU 341 transmits the remote UI content to the client terminal 401 or the smart phone 500 and displays a screen for querying the user, but the invention is not limited to this. Other methods of querying the user are changing the display on the number display unit 332 of the operation panel 305 of the printer 300 or a pattern of blinking/lighting various lamps. In addition, the CPU 341 may wait for an event such as a press of the monochrome start key 333 or the color start key 334 included in the operation panel 305 in response to the query to the user, and set the ink consumption amount reset criteria 3022 in accordance therewith.

Note that in the present embodiment, the values that the ink consumption amount reset criteria 3022 included in the ink consumption amount information 3000 of FIG. 7B can take are explained as the value 0 (=100%) and the value 1 (=50%), but two or more numerical values may also be set as the values. If two or more numerical values are set, the number of options in regards to the ink consumption amount criteria in the query to the user in step S2501 may be increased. The CPU 341 sets the value of the ink consumption amount reset criteria 3022 according to the user's selection.

Third Embodiment

The third embodiment corresponds to a case where the ink capacity of the ink bottle attached when the user purchases the printer 300 is different from the ink capacity of the purchasable ink bottle. Specifically, in the present embodiment, the initial value of the ink consumption amount is changed in accordance with the number of times the ink consumption amount is reset, thereby making it easier to execute the ink consumption amount reset. In the present embodiment, the ink bottle attached at the time of purchase of the printer 300 is the small-capacity bottle 313 illustrated in FIG. 2, and the purchasable ink bottle is the large-capacity bottle 312.

Figure 15A:
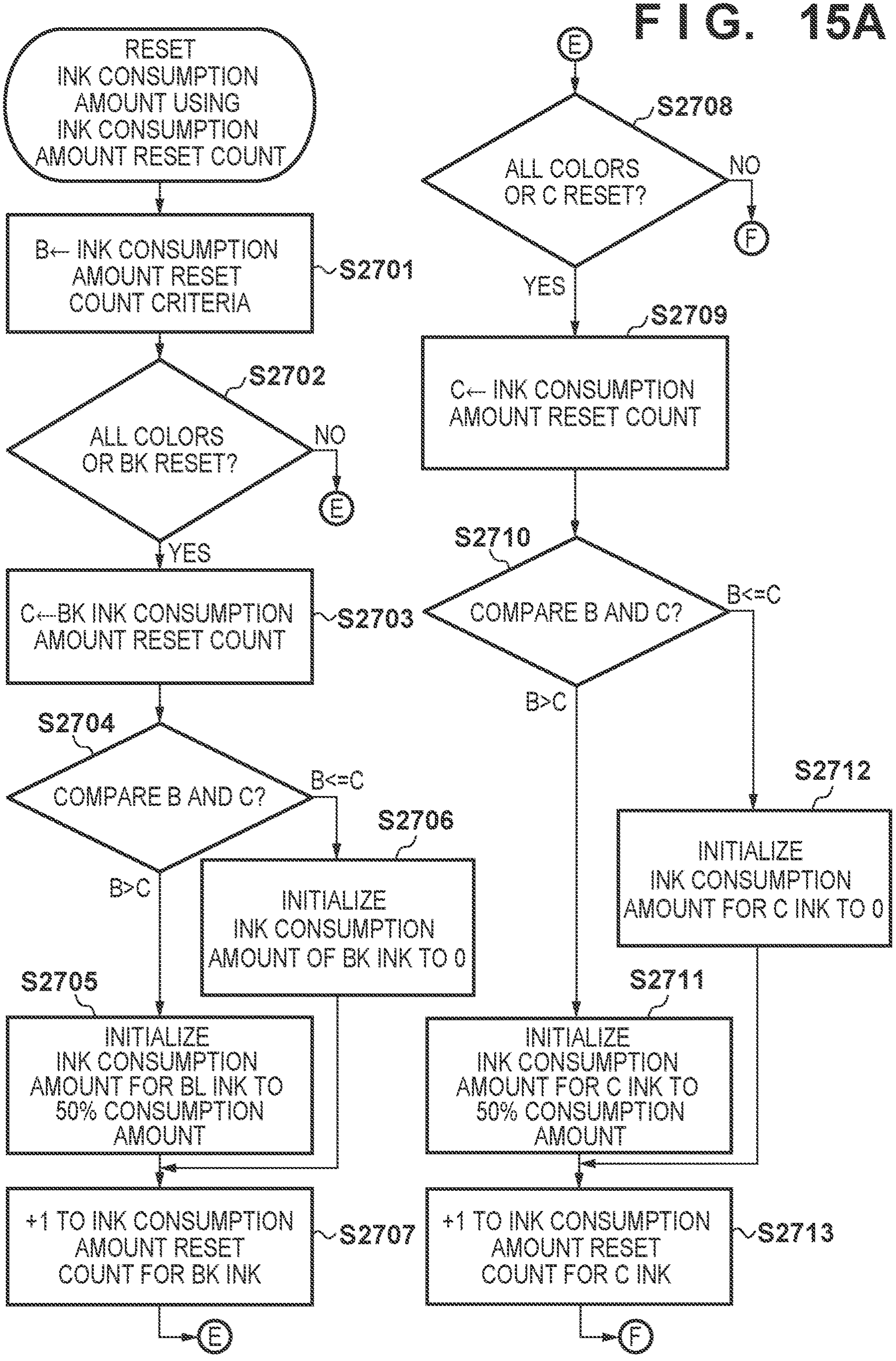
FIGS. 15A and 15B comprise a flowchart for describing processing by the printer for performing a reset of an ink consumption amount using an ink consumption amount reset count.
Figure 15B:
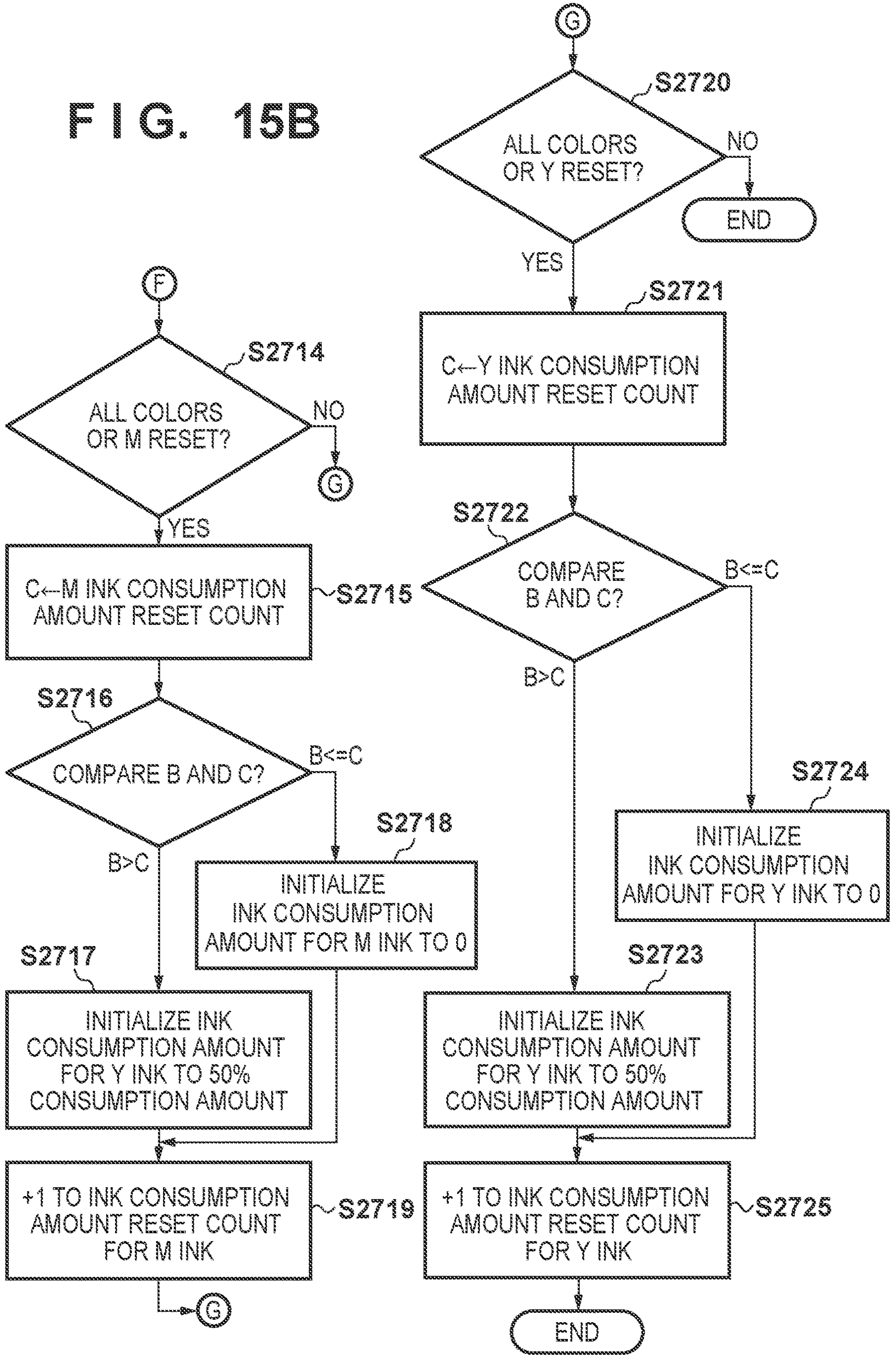

FIGS. 15A and 15B comprise a flowchart for describing processing by the printer for when performing a reset of an ink consumption amount using an ink consumption amount reset count. This processing is executed instead of the 100% ink consumption amount reset in step S2026 of FIG. 8A. In addition, the processing is performed as a subflow of step S2109 of FIG. 9. When the process of FIGS. 15A and 15B is executed in step S2026 of FIG. 8A, it is assumed that resetting of the ink consumption amount for all of the ink colors is designated. Note that the content that the CPU 341 transmits in step S2101 of FIG. 9 may be a screen that differs from the ink consumption amount reset screen illustrated in FIG. 4. This screen may be, for example, a screen in which only options to reset all colors and to reset each ink color are displayed rather than allowing the user to select either a 100% ink consumption amount reset or a 50% ink consumption amount reset.

In step S2701, the CPU 341 acquires the ink consumption amount reset count criteria 3023 included in the ink consumption amount information 3000, and stores it in a variable B within a work area.

In step S2702, the CPU 341 refers to the content of a POST request stored in the data memory 344. The CPU 341 determines whether or not an indication that the target of the ink consumption amount reset is all ink colors or BK ink is included in the content of the POST request. In a case where the CPU 341 determines that an indication that the target of the ink consumption amount reset is all ink colors or BK ink is included in the content of the POST request (Yes in step S2702), the processing proceeds to step S2703. Meanwhile, in a case where the CPU 341 determines that an indication that the target of the ink consumption amount reset is all ink colors or BK ink is not included in the content of the POST request (No in step S2702), the processing proceeds to step S2708.

In step S2703, the CPU 341 acquires the ink consumption amount reset count 3018 of BK ink included in the ink consumption amount information 3000, and stores the ink consumption amount reset count 3018 in a variable C in the work area.

In step S2704, the CPU 341 compares the acquired ink consumption amount reset count criteria 3023 (variable B) with the ink consumption amount reset count 3018 (variable C) of BK ink. The CPU 341 determines whether the variable B is greater than the variable C. If the CPU 341 determines that the variable B is greater than the variable C, the processing proceeds to step S2705. Meanwhile, if the CPU 341 determines that the variable B is equal to or less than the variable C, the processing proceeds to step S2706.

In step S2705, the CPU 341 initializes the ink consumption amount 3006 of BK ink included in the data set 3002 of the ink consumption amount information 3000 to the value of the 50% ink consumption amount 3010.

In step S2706, the CPU 341 initializes the ink consumption amount 3006 of BK ink to the value 0.

In step S2707, the CPU 341 updates (+1) the ink consumption amount reset count 3018 of BK ink.

In step S2708, the CPU 341 refers to the content of a POST request stored in the data memory 344. The CPU 341 determines whether or not an indication that the target of the ink consumption amount reset is all ink colors or C ink is included in the content of the POST request. In a case where the CPU 341 determines that an indication that the target of the ink consumption amount reset is all ink colors or C ink is included in the content of the POST request, the processing proceeds to step S2709. Meanwhile, in a case where the CPU 341 determines that an indication that the target of the ink consumption amount reset is all ink colors or C ink is not included in the content of the POST request, the processing proceeds to step S2714.

In step S2709, the CPU 341 acquires the ink consumption amount reset count 3019 of C ink included in the ink consumption amount information 3000, and stores the ink consumption amount reset count 3019 in the variable C in the work area.

In step S2710, the CPU 341 compares the acquired ink consumption amount reset count criteria 3023 (variable B) with the ink consumption amount reset count 3019 (variable C) of C ink. The CPU 341 determines whether the variable B is greater than the variable C. If the CPU 341 determines that the variable B is greater than the variable C, the processing proceeds to step S2711. Meanwhile, if the CPU 341 determines that the variable B is equal to or less than the variable C, the processing proceeds to step S2712.

In step S2711, the CPU 341 initializes the ink consumption amount 3007 of C ink included in the data set 3003 of the ink consumption amount information 3000 to the value of the 50% ink consumption amount 3011.

In step S2712, the CPU 341 initializes the ink consumption amount 3007 of C ink to the value 0.

In step S2713, the CPU 341 updates (+1) the ink consumption amount reset count 3019 of C ink.

In step S2714, the CPU 341 refers to the content of a POST request stored in the data memory 344. The CPU 341 determines whether or not an indication that the target of the ink consumption amount reset is all ink colors or M ink is included in the content of the POST request. In a case where the CPU 341 determines that an indication that the target of the ink consumption amount reset is all ink colors or M ink is included in the content of the POST request (Yes in step S2714), the processing proceeds to step S2715. Meanwhile, in a case where the CPU 341 determines that an indication that the target of the ink consumption amount reset is all ink colors or M ink is not included in the content of the POST request (No in step S2714), the processing proceeds to step S2720.

In step S2715, the CPU 341 acquires the ink consumption amount reset count 3020 of M ink included in the ink consumption amount information 3000, and stores the ink consumption amount reset count 3020 in the variable C in the work area.

In step S2716, the CPU 341 compares the acquired ink consumption amount reset count criteria 3023 (variable B) with the ink consumption amount reset count 3020 (variable C) of M ink. The CPU 341 determines whether the variable B is greater than the variable C. If the CPU 341 determines that the variable B is greater than the variable C, the processing proceeds to step S2717. Meanwhile, if the CPU 341 determines that the variable B is equal to or less than the variable C, the processing proceeds to step S2718.

In step S2717, the CPU 341 initializes the ink consumption amount 3008 of M ink included in the data set 3004 of the ink consumption amount information 3000 to the value of the 50% ink consumption amount 3012.

In step S2718, the CPU 341 initializes the ink consumption amount 3008 of M ink to the value 0.

In step S2719, the CPU 341 updates (+1) the ink consumption amount reset count 3020 of M ink.

In step S2720, the CPU 341 refers to the content of the POST request stored in the data memory 344. The CPU 341 determines whether or not an indication that the target of the ink consumption amount reset is all ink colors or Y ink is included in the content of the POST request. In a case where the CPU 341 determines that an indication that the target of the ink consumption amount reset is all ink colors or Y ink is included in the content of the POST request (Yes in step S2720), the processing proceeds to step S2721. Meanwhile, in a case where the CPU 341 determines that an indication that the target of the ink consumption amount reset is all ink colors or Y ink is not included in the content of the POST request (No in step S2720), the processing ends.

In step S2721, the CPU 341 acquires the ink consumption amount reset count 3021 of Y ink included in the ink consumption amount information 3000, and stores the ink consumption amount reset count 3021 in the variable C in the work area.

In step S2722, the CPU 341 compares the acquired ink consumption amount reset count criteria 3023 (variable B) with the ink consumption amount reset count 3021 (variable C) of Y ink. The CPU 341 determines whether the variable B is greater than the variable C. If the CPU 341 determines that the variable B is greater than the variable C, the processing proceeds to step S2723. Meanwhile, if the CPU 341 determines that the variable B is equal to or less than the variable C, the processing proceeds to step S2724.

In step S2723, the CPU 341 initializes the ink consumption amount 3009 of Y ink included in the data set 3005 of the ink consumption amount information 3000 to the value of the 50% ink consumption amount 3013.

In step S2724, the CPU 341 initializes the ink consumption amount 3009 of Y ink to the value 0.

In step S2725, the CPU 341 updates (+1) the ink consumption amount reset count 3021 of Y ink, and ends the processing.

As described above, the CPU 341 can execute the ink consumption amount reset function by using the ink consumption amount reset count even in a case where the ink capacity of the ink bottle attached at the time of purchase of the printer 300 differs from the ink capacity of the purchasable ink bottle.

This eliminates the need for the user to select the reset function every time according to the ink capacity of the ink bottle, and makes it easier to execute the ink consumption amount reset.

Note that, in the present embodiment, an example is given in which the ink bottle attached at the time of purchase of the printer 300 is the small-capacity bottle 313, and the purchasable ink bottle is the large-capacity bottle 312, but the invention is not limited thereto. For example, the ink bottle attached at the time of purchase of the printer 300 may be the large-capacity bottle 312 and the purchasable ink bottle may be the small-capacity bottle 313. In addition, the ink bottle attached at the time of purchase of the printer 300 may be a special ink bottle having an ink capacity other than the large-capacity bottle 312 or the small-capacity bottle 313.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2022-171584, filed Oct. 26, 2022, which is hereby incorporated by reference herein in its entirety.

What is claimed is:

1. A printing apparatus comprising:

an ink tank configured to hold ink to be supplied to a print head, wherein ink can be replenished in the ink tank by a plurality of types of ink bottles of different ink capacities for the same color of ink;

a management unit configured to manage information for an ink consumption amount which is an amount of ink consumed in the ink tank; and an updating unit configured to update the information for the ink consumption amount based on an ink capacity corresponding to an ink bottle used to replenish ink among the plurality of types of ink bottles.

2. The printing apparatus according to claim 1, wherein the management unit manages the ink consumption amount by a dot count.

3. The printing apparatus according to claim 1, further comprising a selection unit configured to select one of values corresponding to the ink capacities of each of the plurality of types of ink bottles, wherein the updating unit updates the information for the ink consumption amount based on the selected value.

4. The printing apparatus according to claim 1, further comprising a setting unit configured to set in advance a predetermined value to be used when updating the information for the ink consumption amount, wherein the updating unit updates the information for the ink consumption amount to the predetermined value.

5. The printing apparatus according to claim 4, wherein the setting unit is configured to set, as the predetermined value, a value selected based on a user instruction among values corresponding to the ink capacities of each of the plurality of types of ink bottles.

6. The printing apparatus according to claim 5, wherein the setting unit is configured to automatically set the predetermined value in accordance with the ink capacity of an ink bottle that a user purchased.

7. The printing apparatus according to claim 5, wherein the updating unit obtains a user instruction in a first update operation and updates the information for the ink consumption amount based on a value based on the user instruction, the setting unit sets the value based on the user instruction as the predetermined value, and the updating unit, in a second update operation after the first update operation, updates the information for the ink consumption amount to the predetermined value.

8. The printing apparatus according to claim 7, wherein the updating unit, in the second update operation, updates the information for the ink consumption amount to the predetermined value without requesting input by the user instruction.

9. The printing apparatus according to claim 4, wherein the predetermined value is a value corresponding to the ink capacity of an ink bottle attached in advance to the printing apparatus.

10. The printing apparatus according to claim 9, wherein the updating unit, based on a number of updates to the information for the ink consumption amount to the predetermined value and a predetermined number of times specified in relation to the number of updates, updates the information for the ink consumption amount to the predetermined value or a value different from the predetermined value.

11. The printing apparatus according to claim 10, wherein the value different from the predetermined value is a value corresponding to the ink capacity of an ink bottle that is different from the ink bottle attached in advance to the printing apparatus.

12. The printing apparatus according to claim 4, further comprising a receiving unit configured to receive an instruction to update the information for the ink consumption amount to one of values corresponding to the ink capacities of each of the plurality of types of ink bottles and an instruction to set the predetermined value.

13. The printing apparatus according to claim 12, wherein the receiving unit receives the instruction for updating the information for the ink consumption amount based on the values corresponding to the ink capacities of each of the plurality of types of ink bottles and an instruction for setting the predetermined value from at least one of a remote UI, an operating unit of the printing apparatus, and a terminal operable to communicate with the printing apparatus.

14. The printing apparatus according to claim 1, further comprising a notification unit configured to notify of an error for ink of the ink tank based on the information for the ink consumption amount.

15. A printing system, comprising:

the printing apparatus according to claim 1; and a terminal operable to communicate with the printing apparatus.

16. A method of controlling a printing apparatus comprising:

managing information for an ink consumption amount which is an amount of ink consumed in an ink tank, wherein the ink tank is configured to hold ink to be supplied to a print head, and the ink can be replenished in the ink tank by a plurality of types of ink bottles of different ink capacities for the same color of ink; and updating the information for the ink consumption amount based on an ink capacity corresponding to an ink bottle used to replenish ink among the plurality of types of ink bottles.

17. A printing apparatus comprising:

an ink tank configured to hold ink to be supplied to a print head, wherein ink can be replenished in the ink tank by a plurality of types of ink bottles of different ink capacities for the same color of ink; and a control unit configured to cause a display unit to display a selection screen for allowing a user to select an ink capacity corresponding to an ink bottle used to replenish ink among the plurality of types of ink bottles.

* * * * *